(12) United States Patent
Hill et al.

(10) Patent No.: US 10,785,913 B2
(45) Date of Patent: Sep. 29, 2020

(54) TWO-PIECE HARVESTER HAVING A SHAKER AND A RECEIVER FOR HARVESTING TREE FRUITS OR NUTS

(71) Applicant: ORCHARD-RITE LTD., INC., Union Gap, WA (US)

(72) Inventors: Thomas Morrow Hill, Bellevue, WA (US); Christopher Clyde Coppock, Ellensburg, WA (US); Kent Allen Hebdon, Yakima, WA (US)

(73) Assignee: ORCHARD-RITE LTD., INC., Union Gap, WA (US)

( * ) Notice: Subject to any disclaimer, the term of this patent is extended or adjusted under 35 U.S.C. 154(b) by 169 days.

(21) Appl. No.: 15/967,221

(22) Filed: Apr. 30, 2018

(65) Prior Publication Data
US 2019/0327896 A1    Oct. 31, 2019

(51) Int. Cl.
*A01D 46/26*    (2006.01)
(52) U.S. Cl.
CPC ........ *A01D 46/26* (2013.01); *A01D 2046/262* (2013.01); *A01D 2046/266* (2013.01)
(58) Field of Classification Search
CPC .............. A01D 46/26; A01D 2046/266; A01D 2046/262; A01D 46/00; A01B 51/026; B62D 33/0633
See application file for complete search history.

(56) References Cited

U.S. PATENT DOCUMENTS

| | | | |
|---|---|---|---|
| 3,548,579 A | | 12/1970 | Shipley, Jr. |
| 3,757,976 A | * | 9/1973 | van der Lely ......... A01B 51/00 414/498 |
| 3,808,786 A | * | 5/1974 | Beckens ................ A01D 46/26 56/329 |
| 3,811,581 A | * | 5/1974 | Van Der Lely ...... A01B 51/026 414/686 |
| 3,992,861 A | | 11/1976 | Edwards |

(Continued)

FOREIGN PATENT DOCUMENTS

| | | | | |
|---|---|---|---|---|
| ES | 2014936 A | * | 7/1990 | ............. A01D 46/00 |
| ES | 2043484 A1 | * | 12/1993 | ............. A01B 63/10 |

(Continued)

OTHER PUBLICATIONS

PCT International Search Report and Written Opinion for International Application No. PCT/US2019/028325, dated Jul. 10, 2019 (15 pp.).

*Primary Examiner* — Arpad Fabian-Kovacs
(74) *Attorney, Agent, or Firm* — Holland & Hart LLP

(57) ABSTRACT

Systems, devices, and methods are described for efficient harvesting of fruit or nuts. A two-piece harvester is disclosed that mitigates damage to fruits or nuts deposited on the ground after harvesting from the tree. The two-piece harvester may include a shaker configured to shake a tree and cause the fruits or nuts to fall and a receiver configured to collect the fallen fruits or nuts and deposit the fruits or nuts on the ground or in bins. The shaker and the receiver may each include cabs that are configured to be positioned in a plurality of different positions. The shaker may include a wheel that is extendible between a retract position and an extended position. The receiver may include chute that is configured to deposit the fruits or nuts in different locations based on the direction of travel of the receiver.

28 Claims, 12 Drawing Sheets

(56) References Cited

U.S. PATENT DOCUMENTS

| | | | | |
|---|---|---|---|---|
| 4,350,190 | A | * | 9/1982 | McColl ................ A01G 23/006 144/4.1 |
| 4,881,865 | A | * | 11/1989 | Herolf ................ A01G 23/003 414/550 |
| 5,092,422 | A | * | 3/1992 | Hood, Jr. ............... A01B 63/00 172/306 |
| 5,513,484 | A | * | 5/1996 | Zehavi .................. A01D 46/00 56/16.6 |
| 5,816,037 | A | * | 10/1998 | Chiel .................... A01D 46/26 56/340.1 |
| 5,931,247 | A | * | 8/1999 | Peterson ............... A01G 23/08 144/335 |
| 6,182,725 | B1 | * | 2/2001 | Sorvik .................. A01G 23/08 144/335 |
| 6,442,920 | B1 | | 9/2002 | Peterson et al. |
| 7,032,370 | B2 | | 4/2006 | Suter et al. |
| 10,028,442 | B1 | * | 7/2018 | Crosby ................. A01D 41/12 |
| 2004/0216437 | A1 | * | 11/2004 | Erdmann ............. A01D 41/144 56/10.1 |
| 2004/0221565 | A1 | * | 11/2004 | Suter ..................... A01D 46/26 56/340.1 |
| 2005/0091957 | A1 | * | 5/2005 | Stanners ............... A01D 46/20 56/328.1 |
| 2007/0145759 | A1 | * | 6/2007 | Crawford ............. A01G 23/003 296/1.01 |
| 2008/0047245 | A1 | * | 2/2008 | MacGregor ........... A01D 69/00 56/10.8 |
| 2014/0193231 | A1 | | 7/2014 | Yrjana et al. |

FOREIGN PATENT DOCUMENTS

| | | | | |
|---|---|---|---|---|
| RU | | 1800931 A3 | * 3/1993 | ............ A01B 51/00 |
| WO | WO 02098720 A1 | * 12/2002 | ............ B62D 33/06 |

* cited by examiner

TWO-PIECE HARVESTER HAVING A SHAKER AND A RECEIVER FOR HARVESTING TREE FRUITS OR NUTS

BACKGROUND

The following relates generally to a two-piece harvester, and more specifically to a two-piece harvester having a shaker and a receiver for harvesting tree fruits or tree nuts.

Some nuts and fruit (e.g., almonds, pistachios, macadamias, olives, cherries, prunes, or other tree crops) may be harvested using various methods. After harvesting, some of these nuts and/or fruit may be deposited on the ground and allowed to dry for several days in the sun before they are picked up, shelled, and packaged for sale. Harvesters may be designed to reduce damage to the crop while harvesting, increase related harvesting yields and ease to those assisting with such actions, and provide other advantages.

SUMMARY

The described techniques relate to improved systems, devices, or apparatuses for harvesters, and more specifically for two-piece harvesters. Generally, the described systems, devices, apparatuses, or methods are configured to harvest fruits or nuts. A two-piece harvester is disclosed that may mitigate damage to fruits or nuts that may occur during the process of harvesting including after the fruits or nuts are deposited on the ground. The two-piece harvester may include a shaker configured to shake a tree and cause the fruits or nuts to fall, and a receiver configured to receive and collect the fallen fruits or nuts and deposit the fruits or nuts on the ground or in bins. The shaker and/or the receiver may include a cab that is configured to be in a plurality of different positions to facilitate harvesting and related operations. The shaker may include a wheel that is extendable between a first position (e.g., a retracted position) and a second position (e.g., an extended position). The receiver may include a chute or other feature that is configured to deposit the fruits or nuts in one or more different locations based on various factors, such as the direction of travel of the receiver.

In one embodiment, a device or system may include a shaker configured to travel in a first direction and in a second direction opposite the first direction, the shaker comprising: a shaker head configured to shake a tree, a first deflector configured to direct fruits or nuts falling from the tree in response to shaking the tree, a shaker cab configured to house an operator of the shaker, the shaker cab being rotatable between a first position parallel to a first direction of travel of the shaker and a second position perpendicular to the first direction of travel of the shaker, a receiver configured to travel in the first direction and in the second direction opposite the first direction, the receiver comprising: a second deflector configured to direct the fruits or nuts falling from the tree in response to the shaker shaking the tree, a conveyor configured to receive the fruits or nuts from the first deflector of the receiver and directed from the second deflector of the shaker, and deposit the fruits or nuts on the ground, and a receiver cab configured to house an operator of the receiver, the receiver cab being rotatable between a third position parallel to a direction of travel of the receiver and a fourth position perpendicular to the direction of travel of the receiver.

In some examples of the device or system described above, the shaker cab of the shaker further comprises: a front wall defining a nose of the shaker cab. In some examples of the device or system described above, a first side wall defining a side of the shaker cab. In some examples of the device or system described above, a bearing feature on a front inboard corner configured to permit the shaker cab to rotate relative to the first deflector of the shaker.

In some examples of the device or system described above, the shaker further comprises: a wheel that may be positionable in a retracted position and an extended position, wherein the wheel may be configured to be used in the extended position when the shaker may be traveling along a drive row that includes a line of fruits or nuts deposited on the ground.

In some examples of the device or system described above, the receiver further comprises: a chute configured to receive fruits or nuts from the conveyor and configured to deposit the fruits or nuts on the ground on a first side of a wheel of the receiver when the receiver travels in the first direction and on a second side of the wheel when the receive travels in the second direction.

In some examples of the device or system described above, the fourth position of the receiver cab may be configured to be offset in a lateral direction from the third position. In some examples of the device or system described above, the shaker and the receiver may be configured to collect the fruits or nuts that fall from the tree shaken by the shaker.

In one embodiment, a device or system may include a shaker configured to travel in a first direction and in a second direction opposite the first direction, the shaker comprising: a shaker head configured to shake a tree, a deflector configured to direct fruits or nuts falling from the tree in response to shaking the tree, and a cab configured to house an operator of the shaker, the cab being rotatable between a first position parallel to a first direction of travel of the shaker and a second position perpendicular to the first direction of travel of the shaker.

In some examples of the device or system described above, the shaker further comprises: a plurality of wheels, each wheel being configured to be turned independently of other wheels of the plurality of wheels, wherein the shaker may be configured to automatically cause the plurality of wheels to operate in a forward-wheel steering mode when traveling in the first direction.

In some examples of the device or system described above, the shaker further comprises: a frame component extending between an axis of rotation of a rear wheel and an axis of rotation of a front wheel. In some examples of the device or system described above, a coupling component configured to suspend the cab above the ground, the coupling component coupled with the frame component in a fixed position relative to the frame component and rotatably coupled with the cab.

In some examples of the device or system described above, the coupling component may be coupled with a front inboard corner of the cab. In some examples of the device or system described above, the cab of the shaker further comprises: a front wall defining a nose of the cab. In some examples of the device or system described above, a first side wall defining a side of the cab. In some examples of the device or system described above, a bearing feature on a front inboard corner configured to permit the cab to rotate relative to the deflector of the shaker.

In some examples of the device or system described above, the cab of the shaker further comprises: a second side wall positioned opposite the first side wall and defining a side of the cab, the second side wall being coupled with the front wall. In some examples of the device or system described above, the shaker further comprises: a wheel that may be positionable in a retracted position and an extended position, wherein the wheel rotates about a same axis of rotation in the retracted position and the extended position.

In some examples of the device or system described above, the extended position of the wheel may be configured to be used when the shaker may be traveling along a drive row that includes a line of fruits or nuts deposited on a ground. In some examples of the device or system described above, the cab may be configured for transporting the shaker along a road in the first position and the cab may be configured for shaking trees in the second position. In some examples of the device or system described above, the cab may be rotatable to a third position different from the first position and the second position. In some examples of the device or system described above, the third position may be rotated 180 degrees relative to the first position.

In one embodiment, a device or system may include a receiver configured to travel in a first direction and in a second direction opposite the first direction, the receiver comprising: a deflector configured to direct fruits or nuts falling from a tree in response to a shaker shaking the tree, a conveyor configured to receive the fruits or nuts from the deflector of the receiver and deposit the fruits or nuts on a ground, and a cab configured to house an operator of the receiver, the cab being rotatable between a first position parallel to a direction of travel of the receiver and a second position perpendicular to the direction of travel of the receiver.

In some examples of the device or system described above, the receiver further comprises: a chute configured to deposit the fruits or nuts on the ground in a plurality of different directions. In some examples of the device or system described above, the chute may be positioned over a wheel of the receiver and may be configured to selectively deposit the fruits or nuts on the ground on a first side of the wheel or on a second side of the wheel based at least in part on the direction of travel of the receiver.

In some examples of the device or system described above, the first position of the cab may be configured for transporting the receiver along a road and the second position of the cab may be configured for receiving fruits or nuts.

In some examples of the device or system described above, the receiver further comprises: a plurality of wheels, each wheel rotating on an axis of rotation that may be different from axes of rotation of other wheels of the plurality of wheels, wherein the shaker may be configured to automatically adjust from a first forward-wheel steering mode when the receiver travels in the first direction to a second forward-wheel steering mode when the receive travels in the second direction.

In some examples of the device or system described above, the shaker and/or the receiver may be configured to automatically adjust to a three-wheel steer mode based at least in part on determining that a turning angle of at least one wheel exceeds a turning angle threshold.

In some examples of the device or system described above, the shaker and/or the receiver may be configured to adjust to a crab-wheel steering mode. In some examples of the device or system described above, the second position of the cab may be configured to be offset in a lateral direction from the first position. In some examples of the device or system described above, the cab may be rotatable to a third position different from the first position and the second position.

In some examples of the device or system described above, the third position may be rotated 180 degrees relative to the first position.

DETAILED DESCRIPTION

Systems, devices, and methods for harvesting fruits or nuts are disclosed. Some fruits or nuts, such as almonds, grow on trees. After being harvested, but before being processed, some fruits or nuts, such as almonds, may be allowed to dry in the sun on the orchard floor to properly allow drying and facilitate later aspects of the harvesting process. Depositing the harvested crop on the orchard floor, however, puts the crop at risk of damage or loss. For example, farm equipment may damage the crop as the equipment traverses the tree lines of the orchard or as equipment continues harvesting the same crop or other crops in the same area.

A two-piece harvester is disclosed that mitigates damage to fruits or nuts deposited on the ground after harvesting. The two-piece harvester may include a shaker configured to shake a tree and cause the crops (e.g., fruits or nuts) to fall and a receiver configured to collect the fallen crops (e.g., fruits or nuts) and deposit the crops on the ground or in storage bins. The shaker and/or the receiver may, in some examples, include a cab that is configured to be in a plurality of different positions to facilitate harvesting and provide other advantages. In some examples, the shaker may also include one or more wheels that may be extendible between a first retracted position and a second extended position. The receiver may include one or more chutes that may be configured to deposit the crops, such as fruits or nuts, in different locations based on the direction of travel (e.g., of the receiver).

Figure 1:
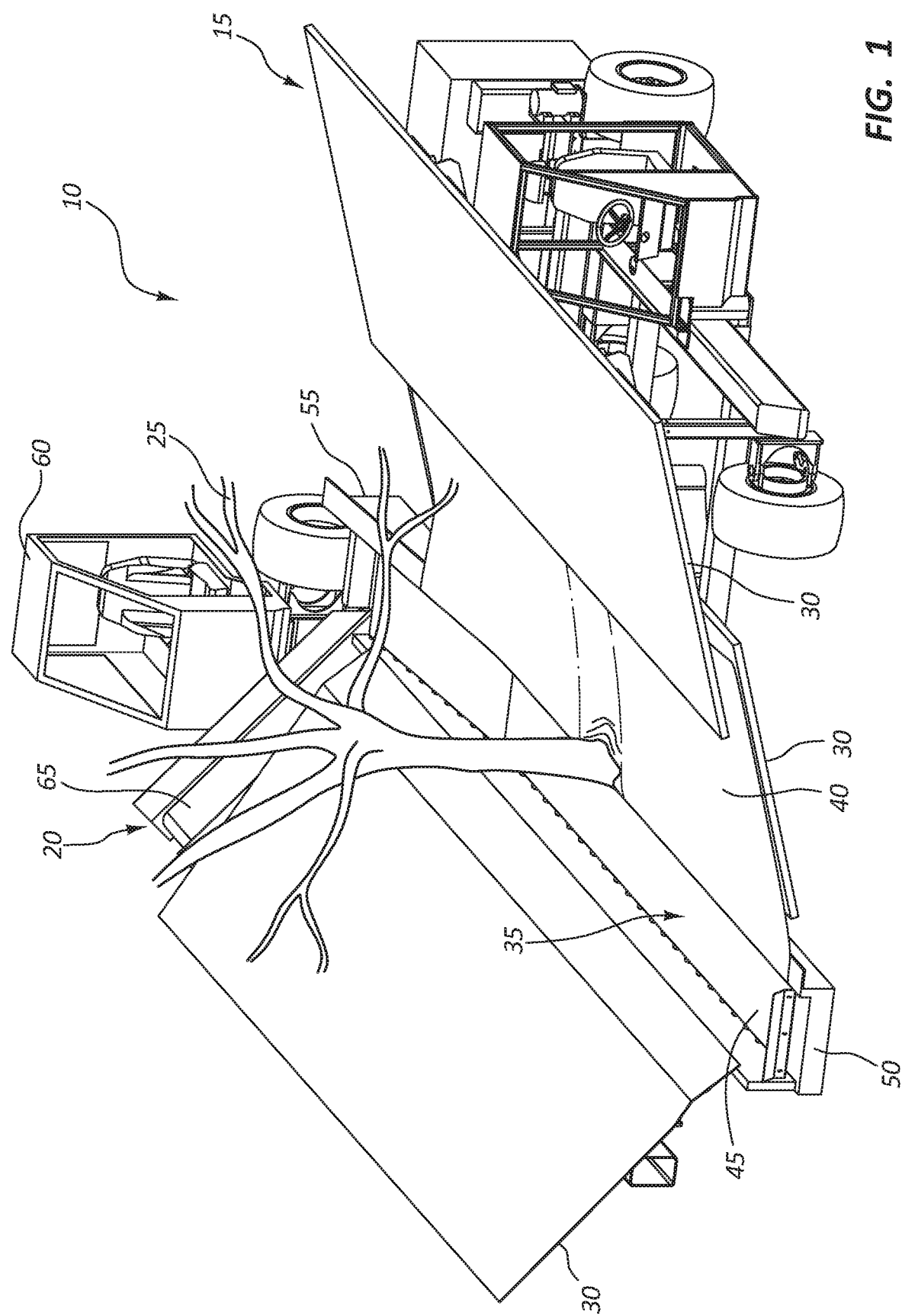
FIG. 1 illustrates an example of a perspective view of a two-piece harvester for harvesting tree fruit or tree nuts having a shaker side and a receiver side in accordance with aspects of the present disclosure.

FIG. 1 illustrates an example of a system 10 for harvesting tree nuts or tree fruit such as almonds in accordance with aspects of the present disclosure. The system 10 may be an example of a two-piece harvester. The system 10 may include a shaker 15 configured to shake a tree and a receiver 20 configured to collect objects (e.g., fruits or nuts) that fall from the shaken tree and to then deposit the fallen objects. In some cases, the shaker 15 may be referred to as a shaker side of a two-piece harvester and the receiver may be referred to as a receiver side of the two-piece harvester.

Some nuts and fruit (e.g., almonds, pistachios, macadamias, olives, cherries, prunes, or other crops) may be harvested using the system 10. The shaker 15 may be configured to grasp a tree 25 and mechanically shake the tree 25 to cause fruits or nuts in the tree to fall. The shaker 15 may include a shaker head that includes jaws or pincers that clamp onto a portion of the tree 25 (e.g., the trunk of a tree). A mechanical motor coupled with the pincers may be configured to cause the tree 25 to shake after the pincers are clamped onto the tree 25.

The system 10 may be configured to collect the fruits or nuts falling from the tree 25 without causing them to be damaged. A shaker 15 may be positioned on a first side of the tree 25 and the receiver 20 may be positioned on a second side of the tree 25. The shaker 15 and the receiver 20 may include one or more deflectors 30 configured to intercept the falling fruits or nuts before they reach the ground and direct the fruits or nuts (e.g., to a conveyor 35 of the receiver 20). In some cases, a covering 40 (e.g., such as a tarp, cloth, or other component to soften the force the falling crops experience) may be positioned over the deflectors 30 to further protect the falling nuts or fruit.

The conveyor 35 of the receiver 20 may be configured to deposit the nuts or fruit in a desired location such as a ground surface or a bin. The conveyor 35 may include one or more motors, rollers, and/or belts to move the fruits or nuts. The conveyor 35 may include one or more portions. A first portion 45 may move nuts from a first end 50 of the receiver 20 toward a second end 55 of the receiver 20 that is associated with the cab 60. A second portion 65 may move nuts from the first portion 45 to a chute that deposits the fruits or nuts on the ground or in a bin. In some cases, the chute may be configured to deposit the fruits or nuts in different places based on the direction of travel of the receiver.

Some fruits or nuts may be allowed to dry before hulling and/or shelling occurs. For example, almonds may be allowed to dry in the sun for extended periods (e.g., several days or weeks) to ensure that the moisture content of the almond is correct for hulling and/or shelling. The receiver 20 may be configured to deposit the fruits or nuts (e.g., almonds) on the ground in a windrow. A windrow may be a row of a harvested crop (e.g., almonds) that is allowed to dry before being processed further (e.g., hulled, shelled, combined, baled, or rolled). To prevent damage to the harvested crop in a windrow, to the trees in the orchard, or other damage that may occur to equipment, crops, or land, the shaker 15 and/or the receiver 20 may include a movable cab. The cabs may be movable to increase the visibility of the operator during different types of operations. For example with the movable cabs, the operator may be able to see the tree and/or any windrows of crop on the ground.

After the crop has dried sufficiently, a pick-up machine may collect the crop in the windrows and transport the crop to other processing facilities. For example, for almonds, a pick-up machine may transport the almonds to a huller/sheller facility. The almonds may be prepared hulled and/or shelled and such a facility and in other ways prepared for sale.

Figure 2A:
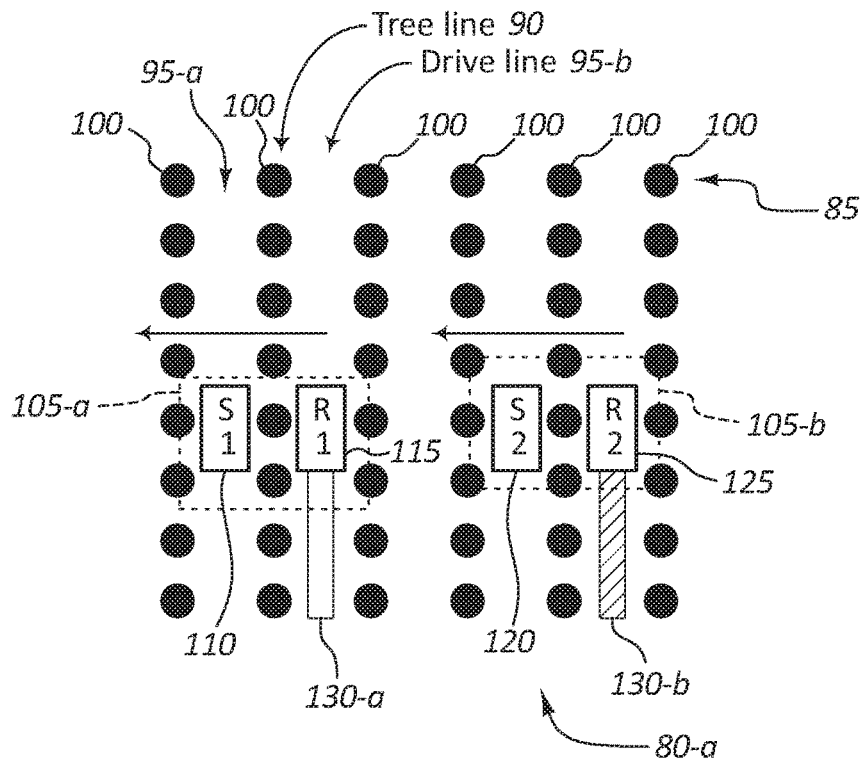
FIGS. 2A and 2B illustrate examples of diagrams of multi-unit harvesting techniques for a harvesting area in accordance with aspects of the present disclosure.
Figure 2B:
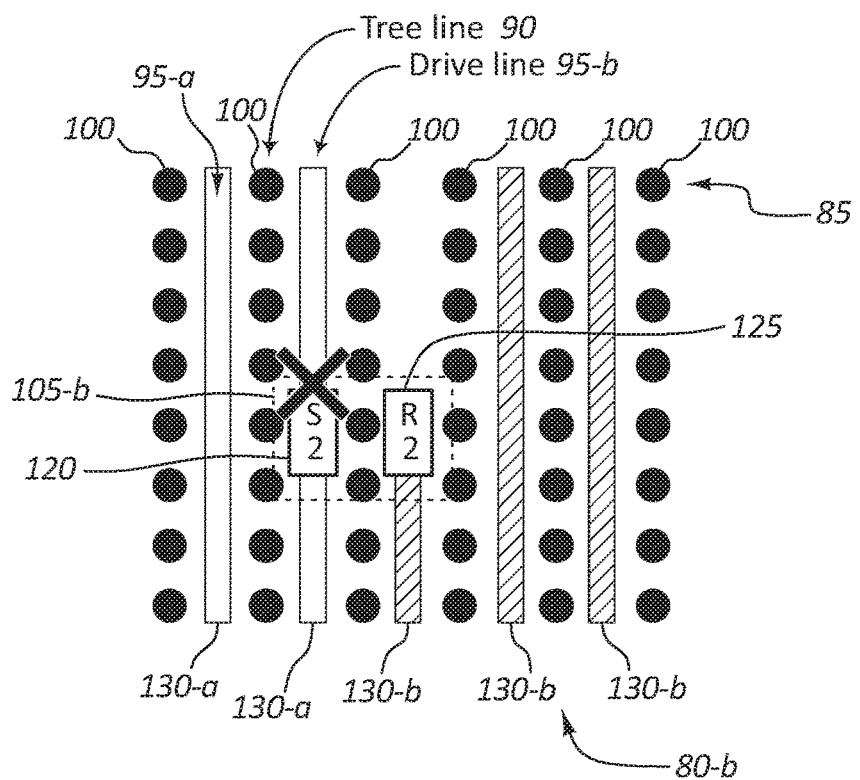

FIGS. 2A and 2B illustrate examples of diagrams 80 of multi-unit harvesting techniques for an orchard 85 in accordance with aspects of the present disclosure. The orchard 85, as one example of a harvesting area, may include a plurality of tree lines 90 and a plurality of drive lines 95. A tree line 90 may include a plurality of trees 100 that grow fruits or nuts. A drive line 95 may be configured to allow equipment such as harvesters, shakers, receivers, pick-up machines, or combinations thereof, to access individual trees 100 of the orchard 85.

Diagram 80-*a* of FIG. 2A illustrates a technique for harvesting the orchard 85 that includes multiple harvesting units 105 operating concurrently. A first harvesting unit 105-*a* operating in the orchard 85 may include a first shaker 110 and a first receiver 115. The first shaker 110 may be an example of the shaker 15 described with reference to FIG. 1, and the first receiver 115 may be an example of the receiver 20 described with reference to FIG. 1. When harvesting a plurality of trees 100 in a tree line 90, the first shaker 110 may travel along a first drive line 95-*a* positioned on a first side of the tree line 90 and a first receiver 115 may travel along a second drive line 95-*b* on a second side of the tree line 90 (e.g., which may be opposite the first side).

When harvesting a fruit or nut of a tree 25, both the first shaker 110 and the first receiver 115 may be positioned next to the same tree 25. The first shaker 110 may shake the tree 100 and the first shaker 110 and/or the first receiver 115 may collect the failing fruits or nuts into a conveyor (e.g., a conveyor of the first receiver 115). In some cases, the first receiver 115 may deposit the fruits or nuts in a windrow 130-*a* in the drive line 95-*b*. The first receiver 115 may be configured to form the windrow 130-*a* behind the first receiver 115 opposite the direction of travel of the first receiver 115.

As the orchard 85 is harvested, the first harvesting unit 105-*a* may move from tree line 90 to tree line 90. Concurrently, a second harvesting unit 105-*b* that may include a second shaker 120 and a second receiver 125 may be harvesting another portion of the orchard 85. The second harvesting unit 105-*b* may deposit its own windrow 130-*b* in the various drive lines 95.

Diagram 80-*b* of FIG. 2A illustrates that using such a multi-harvesting unit technique for the orchard 85 will lead to a situation where the second shaker 120 or the second receiver 125 of a harvesting unit 105-*b* may travel along a drive line 95 that includes a windrow 130 of crops deposited on the ground. For example, diagram 80-*b* shows that the second shaker 120 of the second harvesting unit 105-*b* may travel down the drive line 95-*b* that already includes a windrow 130-*a* deposited by the first harvesting unit 105-*a*.

As the second shaker 120 travels down the drive line 95-*b*, the second shaker 120 may in some cases crush or damage the crop deposited on the ground in the windrow 130-*a*. A harvester may desire to prevent the loss of portions of the crop from being crushed by harvesting equipment.

Shakers 15 and receivers 20 are described herein for preventing the loss of crops during the process of harvesting. For example, a shaker 15 and/or a receiver 20 may include movable cabs to allow operators better vision and control during a harvesting procedure. Further, the movable cabs may be configured to better allow the shaker 15 and the receiver 20 to move bidirectionally along a drive line 95. A shaker 15 may also include an extendible wheel configured to avoid crushing a crop in a windrow 130 deposited in a drive line 95. A receiver 20 may be configured with a chute that may be configured to selectively deposit the crop in the windrow 130 in different locations based on the direction of travel of the receiver 20. Additional details about these features are described with reference to FIGS. 3-12, among other sections.

Figure 3:
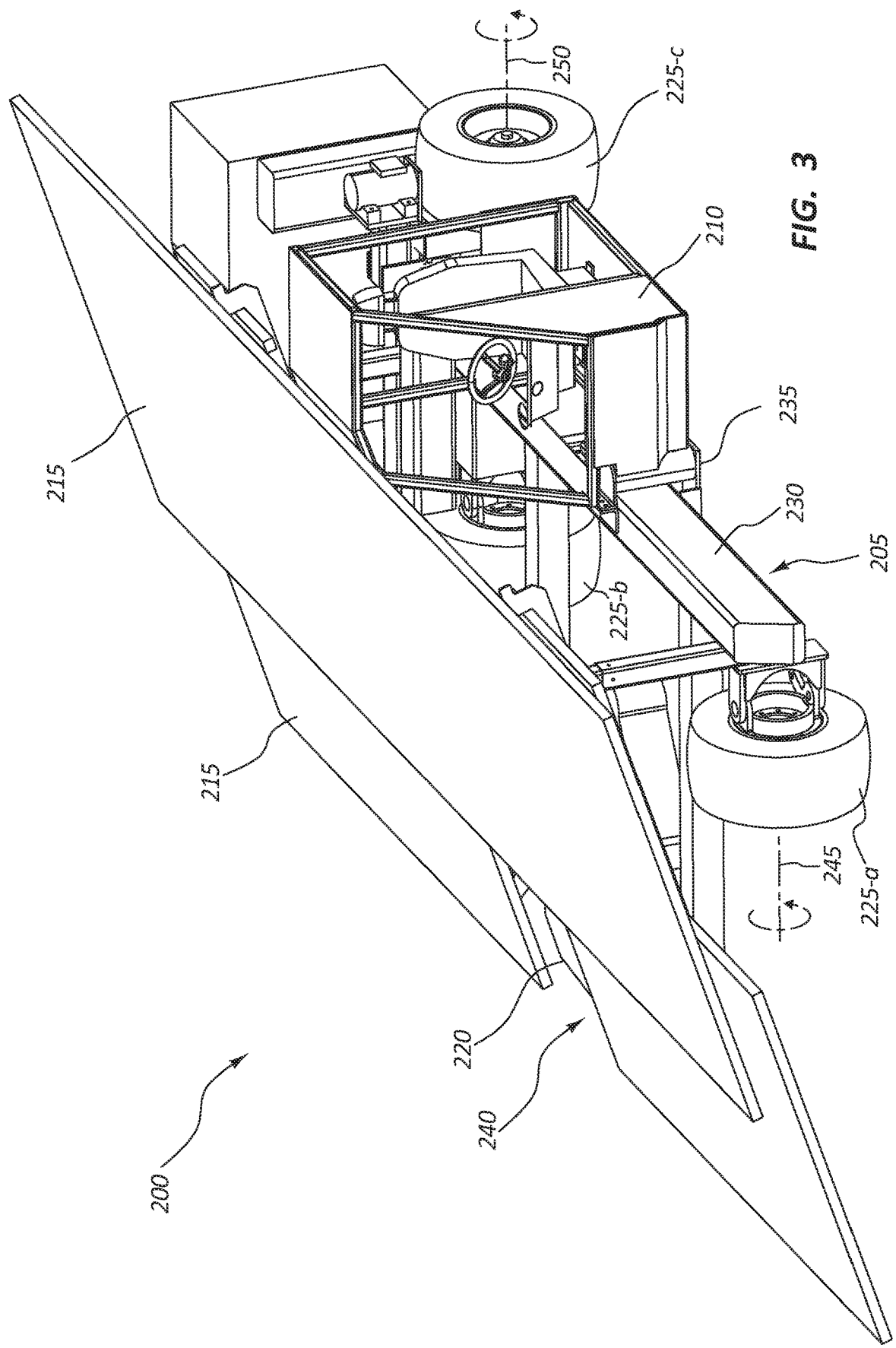
FIG. 3 illustrates an example of a perspective view of a shaker side of a harvester in accordance with aspects of the present disclosure.

FIG. 3 illustrates an example of a shaker 200 for harvesting tree nuts or tree fruit such as almonds in accordance with aspects of the present disclosure. The shaker 200 may be an example of the shaker 15 described with reference to FIG. 1. The shaker 200 may be configured to couple with a tree and shake the tree so that fruits or nuts fall out of the tree. The shaker 200 may include a frame 205, cab 210, one or more deflectors 215, shaker head 220, and a plurality of wheels 225.

The frame 205 may be a supporting structure of the shaker 200. The frame 205 may be configured to support components of the shaker 200 and to deal with static and dynamic loads, without undue deflection or distortion. The frame 205 may include one or more beams or rails. For example, a central beam 230 may extend between an axis of rotation of a front wheel 225-a and an axis of rotation of the plurality of rear wheels 225-b, 225-c.

The cab 210 may be coupled with the central beam 230 of the frame 205 using a coupling component 235. The coupling component 235 may be configured such that the cab 210 is rotatable relative to the frame 205. As described with more detail in FIGS. 4A and 4B, the cab 210 may be movable between a first position (e.g., a position parallel to a first direction of travel of the shaker 200 (shown in FIG. 3)) and a second position (e.g., a position perpendicular to the first direction of travel of the shaker 200). In some cases, the cab 210 may be positionable in more positions than the first position or the second position. For example, the cab 210 may be configured to slide along the central beam 230 in some cases. The cab 210 may be positionable in a variety of different rotations and/or rotation angles relative to the frame 205, including one or more positions between or at set or variable positions between a first position (e.g., a position parallel to a first direction of travel of the shaker 200 (shown in FIG. 3)) and a second position (e.g., a position perpendicular to the first direction of travel of the shaker 200).

The one or more deflectors 215 of the shaker 200 may be configured to deflect falling objects (e.g., nuts, almonds) into a conveyor of a receiver. The deflectors 215 may be examples of the deflectors 30 described with reference to FIG. 1. The shaker 200 may include any number of deflectors 215 (e.g., one, two, three, four, five, six, seven, eight). In the illustrative example, the shaker 200 may include two deflectors, an upper deflector and a lower deflector. The deflectors 215 may be repositionable in some cases to provide distinct advantages. For example, the upper deflector 215 may be configured to move up-and-down. The lower deflector 215 may be configured to move up-and-down or laterally away from or toward the cab 210. The lower deflector 215 may include a notch 240 sized to receive a tree and/or allow the shaker head 220 to operate and grasp the tree. These configurations and related operations will lead to increased efficiencies and overall efficacy in harvesting. The deflectors 215 may be sized to extend beyond the dimensions of the canopy of the tree, at least the canopy of a first side of the tree. The deflectors 215 may be configured to be positionable based on the canopy of the tree being harvested.

The shaker head 220 may be configured to grasp and shake a tree. The shaker head 220 may be configured to move in a variety of different directions to grasp the tree. For example, the jaws or pincers, among other potential example components, may be configured to move away from or toward the cab 210. When the shaker 200 prepares to shake a tree, the operator may move shaker head 220 of the shaker to align with the tree. Once the jaws or pincers are aligned, the operator may move the open shaker head 220 away from the cab 210 such that the pincers of the shaker head 220 surround the tree. The shaker head 220 may include one or more movable pincers configured to receive and squeeze an object between them e.g., a trunk of a tree). In some cases, the jaws may be configured to be movable in one or more directions (e.g., a front-to-hack direction or a side-to-side direction or a combination). Such movement may allow the jaws to improve alignment with the tree without moving the entire shaker 200. The shaker head 220 may be configured to shake or vibrate the tree once the shaker head 220 has grasped the tree.

The shaker 200 may include a plurality of wheels 225 in some cases. In the illustrative example, the shaker 200 includes three wheels, a first wheel 225-a rotating on a first axis of rotation 245 and a second wheel 225-b and a third wheel 225-c rotating along a second axis of rotation 250. In some cases, as described in more detail with reference to FIGS. 7A and 7B, the third wheel 225-c may be selectively extendible to avoid crushing fruits or nuts in a windrow. The wheels 225 may be coupled to the frame 205 using a plurality of components and/or linkages to allow each wheel to be controlled independently.

Each of the wheels 225 may be independently steerable, meaning that the turning angle of each wheel 225 and/or the direction of travel of each wheel may be independently controlled. By having independent control of each wheel, the shaker 200 may be configured to operate using a plurality of steering modes. A steering mode may indicate a configuration of each wheel 225. A steering mode may indicate a turning angle of a wheel 225, whether a wheel is configured to change its turning angle or whether the turning angle is fixed, whether the turning angle of the wheel is tied to the turning angle of another wheel, a direction of rotation of wheel, whether the direction of rotation of the wheel is tied to the direction of rotation of another wheel, or a combination thereof.

An example of steering modes may be a forward-wheel steer mode where the wheel(s) farthest forward relative to the direction of travel are configured to turn and steer the vehicle and the wheels farther back relative to the direction of travel are not configured to turn (e.g., have a fixed turning angle). Most vehicles used by consumers use a forward-wheel steer mode. Another example of a steering mode is a rear-wheel steer mode where the rear wheels are configured to turn and the front wheels are not configured to turn. Another example of a steering mode is a crab steer mode where all of the wheels turn synchronously in the same direction. Yet another example of a steering mode is four wheel steering where the front wheels are angled in the opposite direction as the rear wheels which allows the shaker 200 to turn on a tight axis. Another example of a steering mode is an independent steer mode where the turning angle and direction of each wheel are independently configurable.

In some cases, the shaker 200 may include a controller to operate in a forward wheel steer mode regardless of the direction of travel. For example, the shaker 200 may be traveling in a first direction down a drive line where the first wheel 225-*a* is the forward wheel and the second and third wheels 225-*b*, 225-*c* are the rear wheels. In such a situation, the controller may cause the first wheel 225-*a* to steer the shaker 200 and the rear wheels 225-*b*, 225-*c* to have a fixed turning angle. If the shaker 200 changes its traveling direction without turning around and begins traveling in a second direction opposite the first direction down the same drive line, the controller may be configured to automatically modify the steering mode based on detecting the change in direction. Specifically, the controller may cause the second wheel 225-*b* and the third wheel 225-*c* (now the forward wheels) to steer the shaker 200 and the first wheel 225-*a* (now the rear wheel) to have a fixed and/or a variable turning angle. A controller is described with more detail with reference to FIG. 12.

Figure 4A:
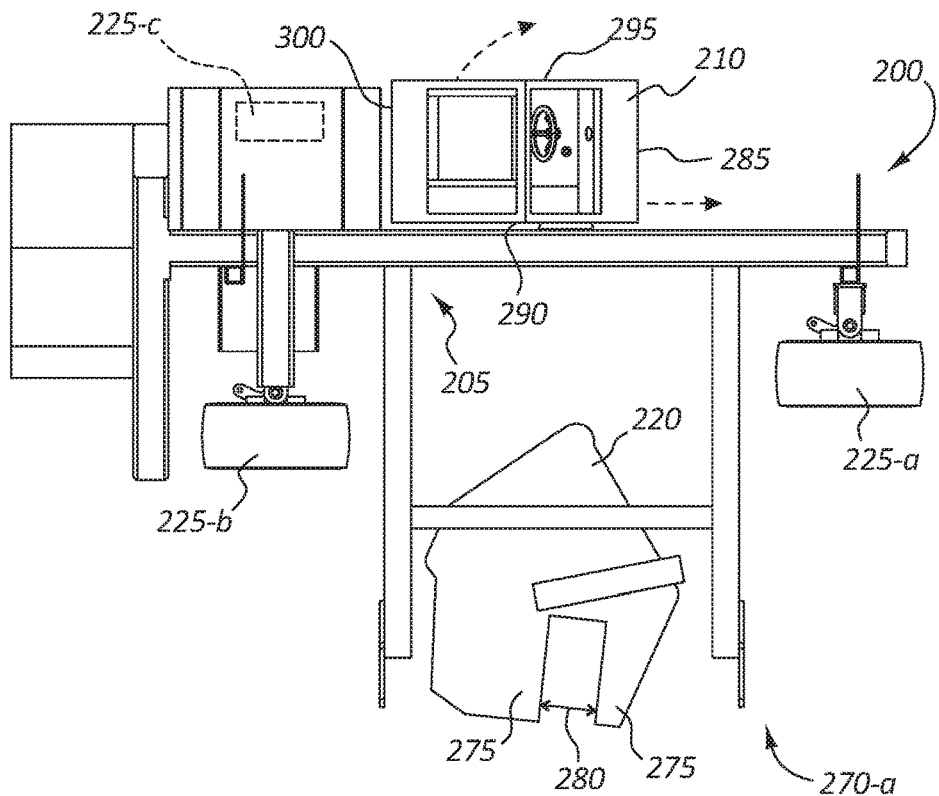
FIGS. 4A and 4B illustrate examples of plan views of a shaker side of a harvester in accordance with aspects of the present disclosure.
Figure 4B:
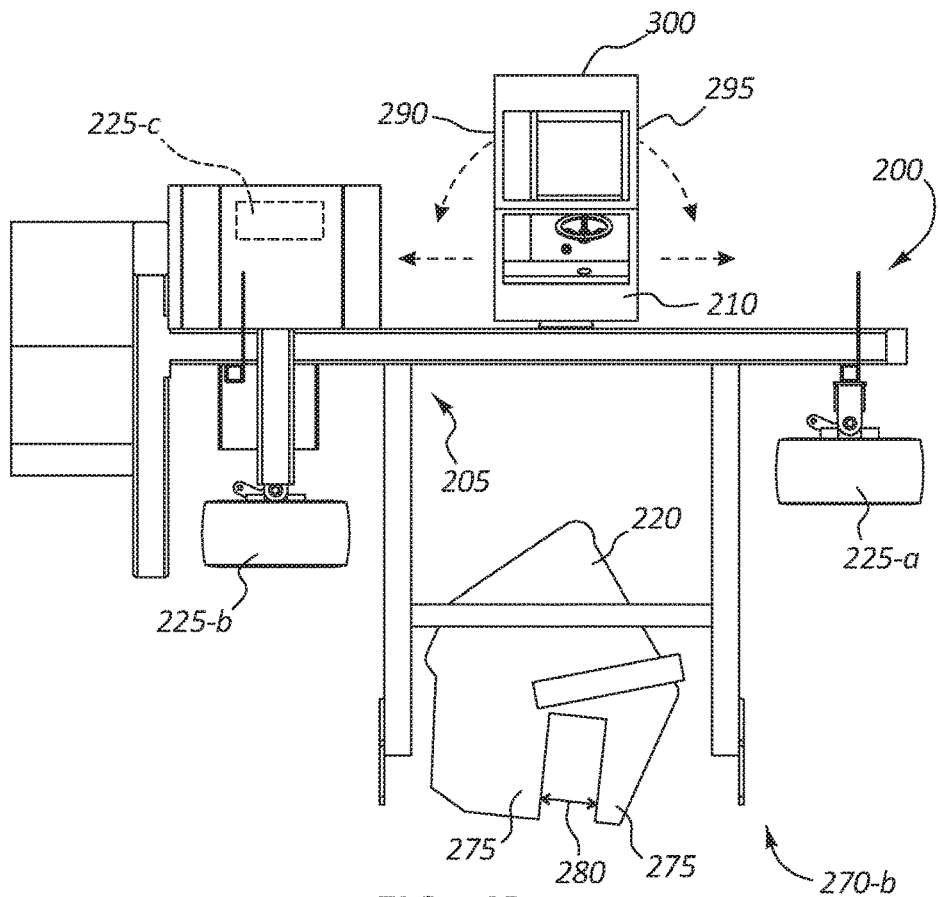

FIGS. 4A and 4B illustrate examples of rotational cab positions 270 of the shaker 200 in accordance with aspects of the present disclosure. The shakers 200 are illustrated in using a top plan view with the deflectors removed to highlight the rotational cab positions 270.

With the deflectors removed various features of the shaker head are more clearly visible. For example, the shaker head 220 may include a pair of pincers 275 or jaws that are configured to clamp to a tree. The pair of pincers 275 may be opened wide enough to receive a tree. Once the tree is positioned in the space 280 between the pincers 275, one or more of the pincers 275 may be moved to touch the tree. Once the shaker head 220 is coupled with tree, the shaker head 220 may be shaken, thereby causing the tree to shake, and thereby causing fruits or nuts to fall from the tree.

The first rotational cab position 270-*a* of FIG. 4A shows the shaker in a first configuration. The first configuration may be used for driving the shaker 200 down a road or for harvesting certain types of fruits or nuts. In some cases, the first configuration may be used for harvesting certain types of fruits or nuts that are deposited in bins instead of being deposited on the ground. The cab 210 may include a front wall 285, a first side wall 290, a second side wall 295 opposite the first side wall 290, and rear wall 300 opposite the front wall 285. When operating the shaker 200, an operator positioned in the cab 210 may be configured to face the front wall 285. In the first rotational cab position 270-*a*, the cab 210 may be rotated such that front wall 285 may face the front of the shaker 200 and the first side wall 290 may face the shaker head 220.

The first rotational cab position 270-*a* may be an example of a first configuration where the operator is capable of controlling the shaker as it travels down a road or as it is loaded or off-loaded from a transportation truck, or for harvesting certain types of fruits or nuts. When in the first rotational cab position 270-*a*, the operator may have a view of what lies ahead for the direction of travel.

The first rotational cab position 270-*a* may obstruct a view of what is behind the operator and may obstruct the view of the shaker head 220. In some cases, while harvesting in the first rotational cab position 270-*a*, an operator's view of certain surroundings may be obstructed. Such obstructed views may lead to mistakes while harvesting and/or damaged trees and/or a damaged crop.

From the first rotational cab position 270-*a*, the cab 210 may be rotatable in at least a first rotation direction. In some cases, the cab 210 may be slidable along the central beam 230 in addition to or as an alternative to being rotatable in at least a first direction.

The second rotational cab position 270-*b* of FIG. 4B shows the shaker in a second configuration. The second configuration may be used for harvesting certain types of fruits or nuts (e.g., almonds). In the second rotational cab position 270-*b*, the cab 210 is rotated such that front wall 285 may face the shaker head. In the second rotational cab position 270-*b*, the cab 210 may be positioned perpendicular to the direction of travel of the shaker 200, among other configurations.

The second rotational cab position 270-*b* may provide an operator a view of the shaker head 220 and both directions of potential travel. Thus, while harvesting crops, the operator may be able to observe the tree and the direction of travel and thereby prevent damage to the trees or crops deposited in windrows on the ground, among other advantages.

From the second rotational cab position 270-*b*, the cab 210 may be rotatable in the first rotation direction or in a second rotation direction. The cab 210 may be configurable in a number of rotation positions between the first rotational cab position 270-*a* and the second rotational cab position 270-*b*. In some cases, the cab 210 may be rotatable such that the front wall 285 faces the rear of the shaker 200 and the second side wall 295 faces the shaker head 220. In some cases, the cab 210 may be slidable along the central beam 230 in any rotation configuration.

Figure 5:
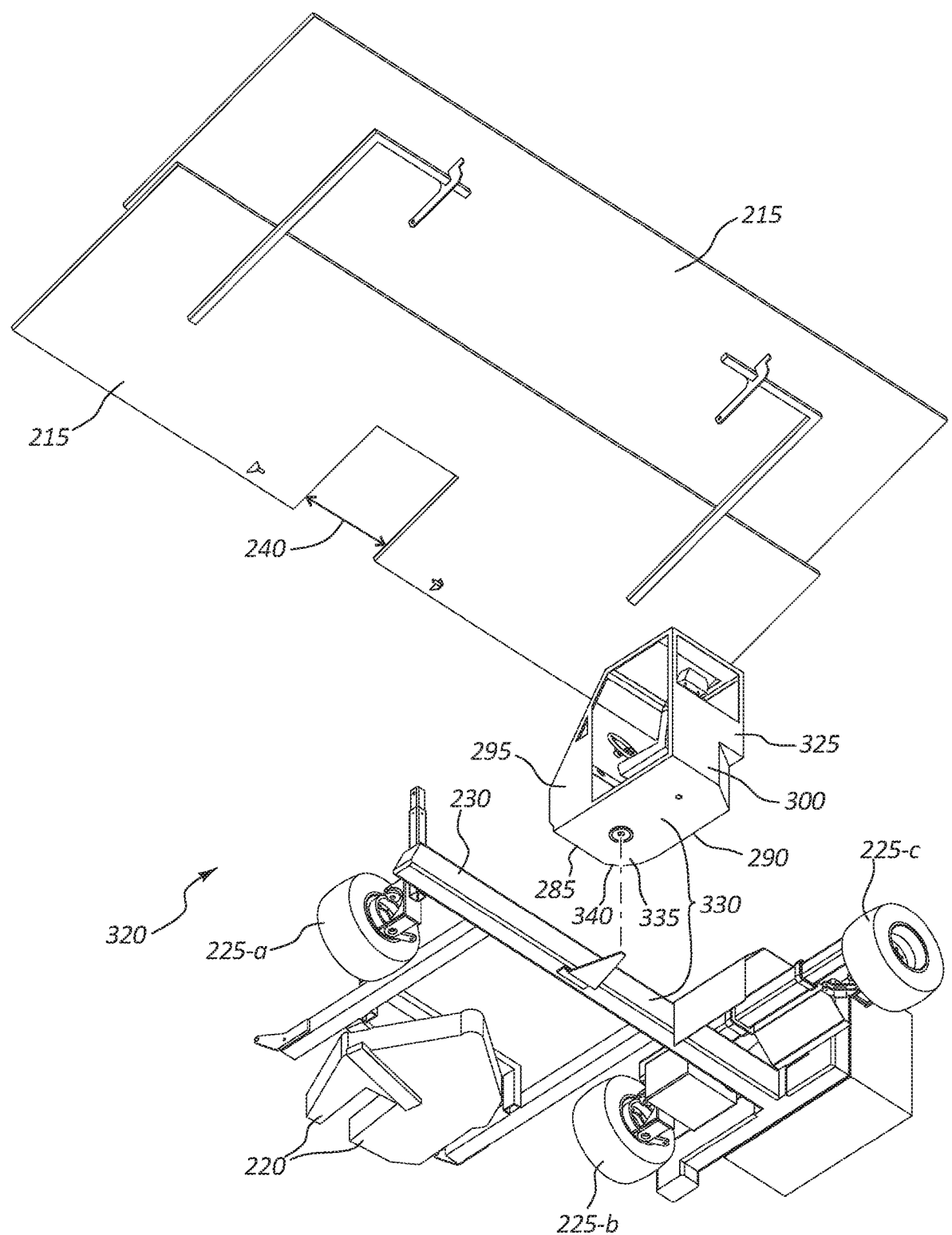
FIG. 5 illustrates an example of an exploded diagram of a shaker side of a harvester in accordance with aspects of the present disclosure.

FIG. 5 illustrates an example of a shaker 320 for harvesting tree nuts or tree fruit such as almonds in accordance with aspects of the present disclosure. The shaker 320 may include a cab 325 coupled to the central beam 230 of the frame 205 using a coupling component 330. The cab 325 and the coupling component 330 may cooperate to allow the cab 325 to rotate relative to the frame 205 of the shaker 200. The shaker 320 may be an example of the shakers 15, 110, 120, and 200 described with reference to FIGS. 1-4. The cab 325 may be an example of the cab 210 described with reference to FIGS. 3-4. The coupling component 330 may be an example of the coupling component 235 described with reference to FIG. 3.

The coupling component 330 may be configured to allow the cab 325 to rotate relative to the frame 205. The coupling component 330 may be fixedly coupled with the central beam 230 of the frame 205 and may be rotationally coupled to a bottom wall 335 of the cab 325. The coupling component 330 may cantilever out away from central beam 230 and may be configured to support the weight of cab 325.

The walls of the cab 325 may be formed to allow the cab 325 to rotate without getting bound by the frame 205. To permit rotation a plurality of chamfer walls or chamfered walls 340 may positioned between the front wall 285 and one or more of the side walls 290, 295. The chamfered wall 340 may be configured to round-off the corner between the front wall 285 and the one or more side walls 290, 295. In some cases, the chamfered walls 340 may be examples of bevel walls or beveled walls.

The coupling component 330 may include a locking component to fix the cab 325 in a particular rotation position relative to the frame 205. Examples of the locking component may include a pin and latch to hold the cab to the frame or, the cab may be hydraulically actuated to rotate and/or hold its position relative to the frame.

When in the second configuration, an operator positioned in the cab 325 may have a line-of-sight out of a window or gap of the front wall 285 to the shaker heard 220. When the deflectors 215 are positioned on the shaker 320, the operator may be able to view tree and the shaker head 220 by looking under the deflectors 215 and through the notch 240 in the lower deflector. Also, when in the second configuration, an operator positioned in the cab 325 may have a line-of-sight in both directions of travel of the shaker 320 out of windows or gaps built into the side walls 290, 295.

Figure 6:
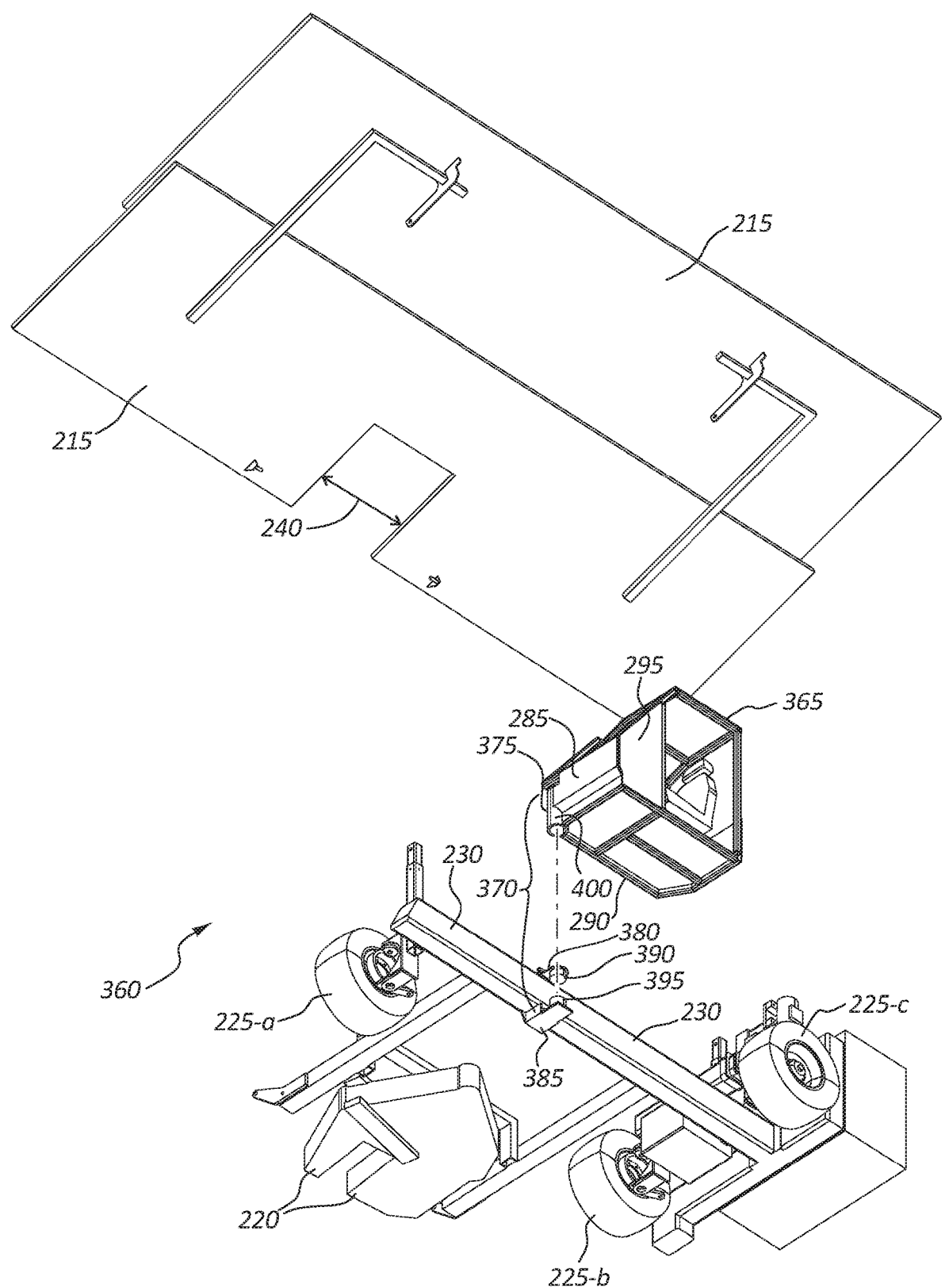
FIG. 6 illustrates an example of an exploded diagram of a shaker side of a harvester in accordance with aspects of the present disclosure.

FIG. 6 illustrates an example of a shaker 360 for harvesting tree nuts or tree fruit such as almonds in accordance with aspects of the present disclosure. The shaker 360 may include a cab 365 coupled to the central beam 230 of the frame 205 using a coupling component 370. The cab 365 and the coupling component 370 may cooperate to allow the cab 365 to rotate relative to the frame 205 of the shaker 200. The shaker 360 may be an example of the shakers 15, 110, 120, and 200 described with reference to FIGS. 1-4. The cab 365 may be an example of the cab 210 described with reference to FIGS. 3-4. The coupling component 370 may be an example of the coupling component 235 described with reference to FIG. 3.

The coupling component 370 may be configured to allow the cab 365 to rotate relative to the frame 205. The coupling component 370 may be fixedly coupled with the central beam 230 of the frame 205 and may be rotationally coupled to a front inboard corner 375 of the cab 365. The front inboard corner 375 may be positioned at a corner of a front wall 285 and one of the side walls 290, 295.

The coupling component 370 may be an example of a bearing feature. The coupling component 370 may be configured to support the weight of the cab 365 and to allow the cab 365 to rotate relative to the frame 205. The coupling component 370 may include bearings or features of bearing that perform such functions. For example, the coupling component 370 may include one or more roller bearings, ball bearings, jewel bearing, fluid bearing, magnetic bearing, or a flexure bearing.

In some examples, the coupling component 370 may be an example of a plain bearing with a shaft or protrusion rotating in a hole. The coupling component 370 includes an upper arm 380 extending from a top portion of the central beam 230 and a lower arm 385 extending from a bottom portion of the central beam 230. The upper arm 380 may include a first cylinder 390 extending downwardly. The lower arm 385 may include a second cylinder 395 extending upwardly. The two cylinders 390, 395 may be configured to be received into a tube 400 coupled with the cab 365. The tube 400 may have a cavity at either end. The inner diameter of the cavities may be sized to receive the cylinders 390, 395. In some cases, the cavities of the tube may be connected such that they form one cavity. In such configurations, the tube 400 may be a hollow tube.

The coupling component 370 may include a locking component to fix the cab 365 in a particular rotation position relative to the frame 205. Examples of the locking component may include a pin and latch to hold the cab to the frame or, the cab may be hydraulically actuated to rotate and/or hold its position relative to the frame.

When in the second configuration, an operator positioned in the cab 365 may have a line-of-sight out of a window or gap of the front wall 285 to the shaker heard 220. When the deflectors 215 are positioned on the shaker 360, the operator may be able to view tree and the shaker head 220 by looking under the deflectors 215 and through the notch 240 in the lower deflector. Also, when in the second configuration, an operator positioned in the cab 365 may have a line-of-sight in both directions of travel of the shaker 360 out of windows or gaps built into the side walls 290, 295.

Figure 7A:
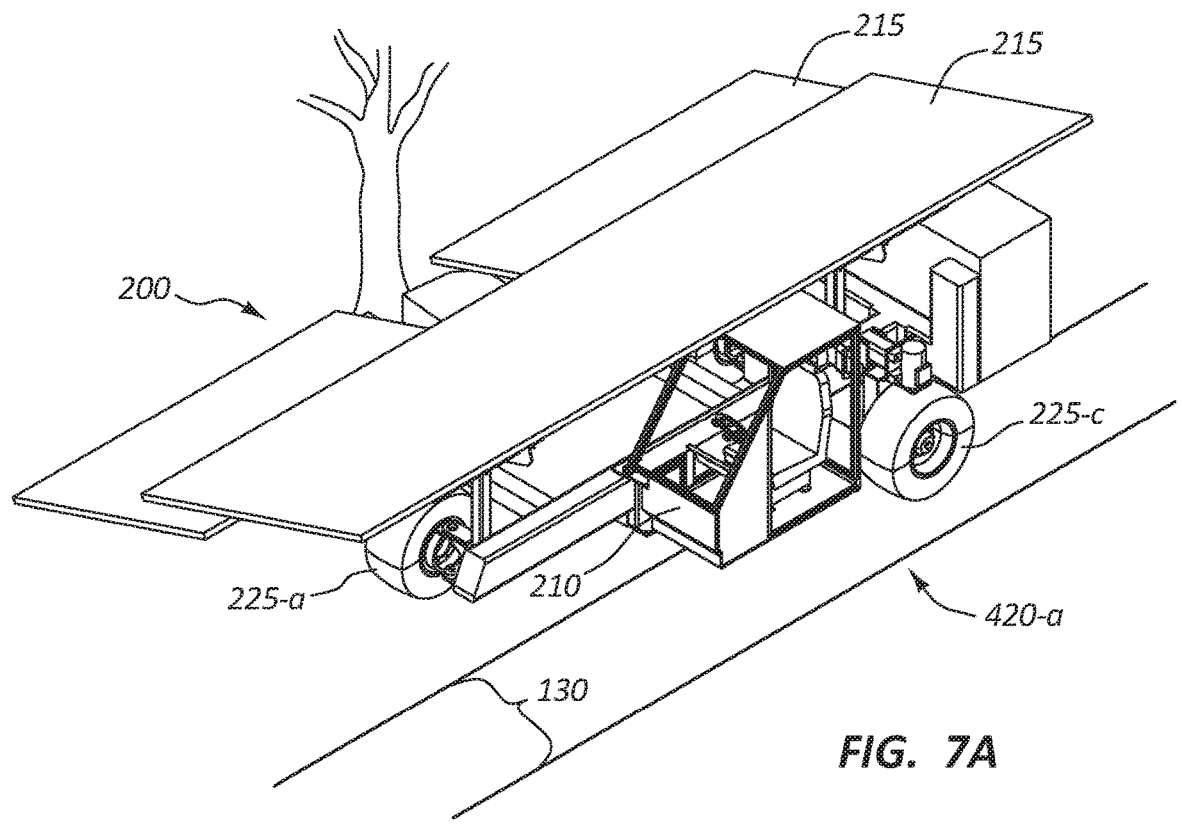
FIGS. 7A and 7B illustrate examples of perspective views of a shaker side of a harvester in accordance with aspects of the present disclosure.
Figure 7B:
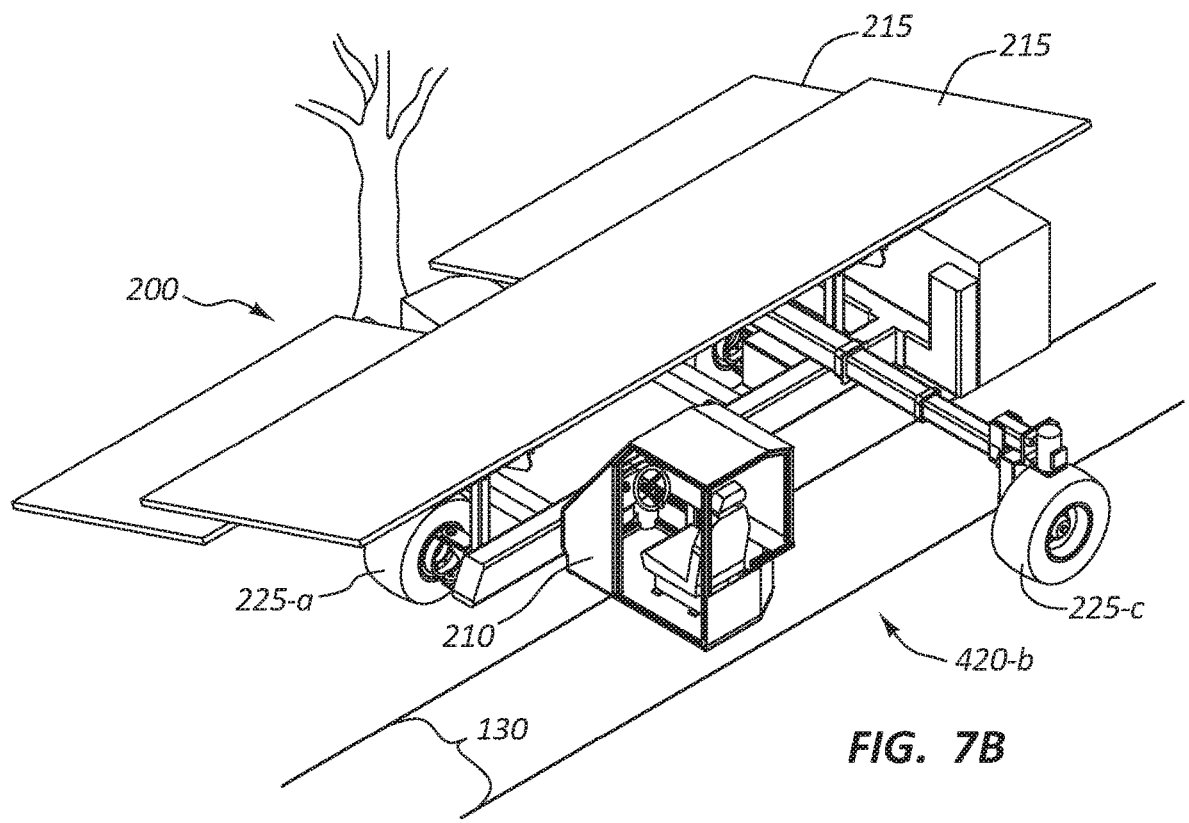

FIGS. 7A and 7B illustrate examples of wheel configurations 420 of the shaker 200 in accordance with aspects of the present disclosure. One or more of the wheels 225 of the shaker 200 may be extendible. When traveling down a drive line 95 that includes a windrow 130 of crop deposited on the ground, one or more of the wheels 225 may damage crop in the windrow 130. For example, FIG. 7A shows the third wheel 225-c in a first Wheel configuration 420-a, where the third wheel 225-c drives along the windrow 130 and, thus, may crush fruits or nuts in the windrow 130.

The shaker 200 may include a plurality of wheel configurations 420 to protect crops deposited on the ground from being crushed by the shaker 200. In addition the plurality of wheel configurations 420 also allow the shaker 200 to travel down roads without being too wide.

In a first wheel configuration 420-a shown in FIG. 7A, the third wheel 225-c may be in a retracted position. The retracted position limits the total width of the shaker 200 and may be used when the shaker 200 is traveling down roads or is being transported by a truck.

In a second wheel configuration 420-b shown in FIG. 7B, the third wheel 225-c may be in an extended position. The extended position may be configured such that the third wheel 225-c does not travel along a windrow 130 of crop on the ground. The third wheel 225-c may be configured to be extended into a plurality of extended positions (e.g., that extend at fixed intervals or are dynamically extendible) based on the size and location of the windrow 130. The extended position may be configured such that the shaker 200 passes over the windrow 130 of crop without damaging the crop in the windrow 130.

The extendible wheel (e.g., the third wheel 225) of the shaker 200 may be independently configurable from the cab. Therefore, any combination of cab positions and wheel positions is possible. For example, FIG. 7A shows the cab 210 of the shaker 200 in the first configuration and the third wheel 225-c in a retracted position; and FIG. 7B shows the cab 210 of the shaker in a second configuration and the third wheel 225-c in an extended position, among other possibilities.

Figure 8:
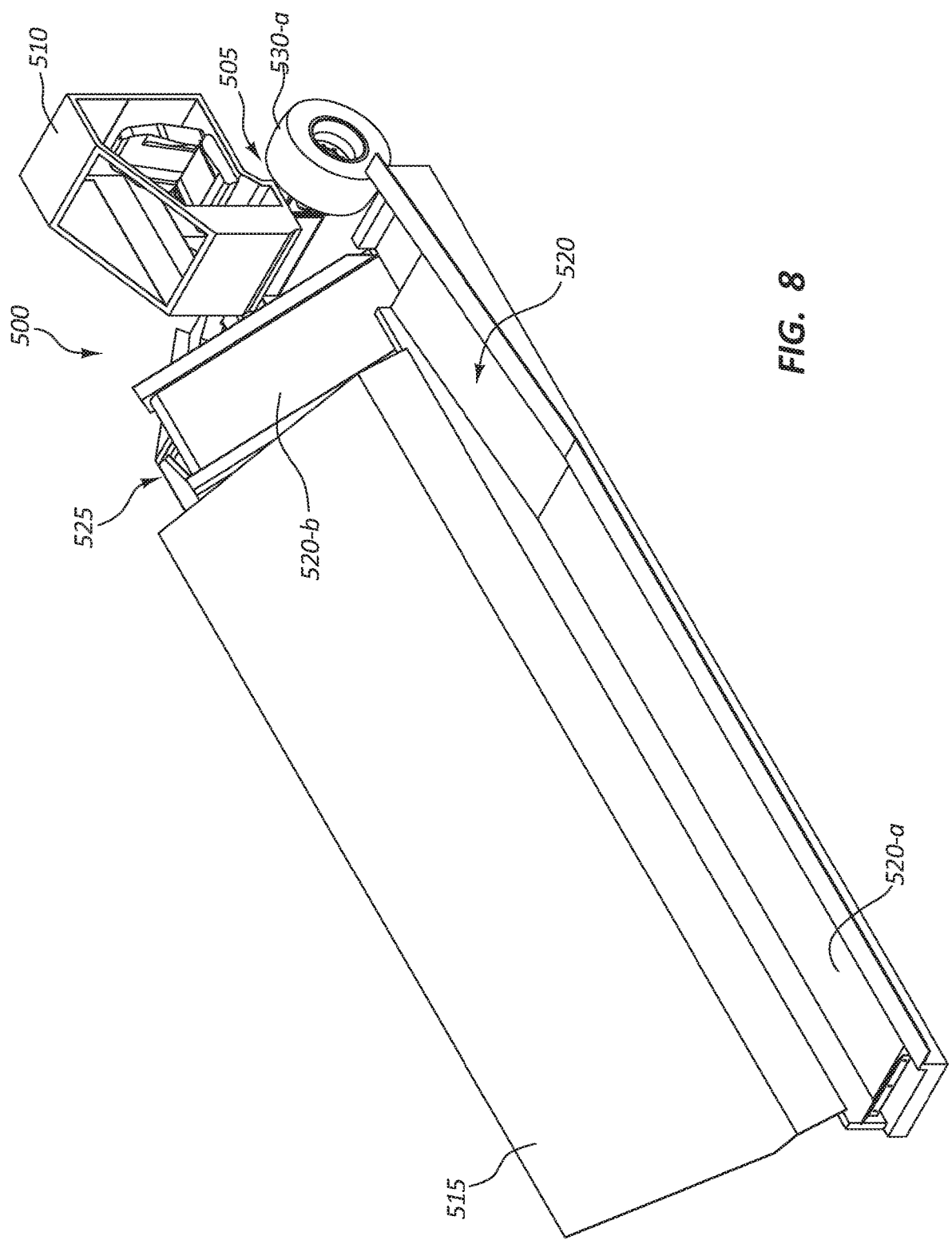
FIG. 8 illustrates an example of a perspective view of a receiver side of a harvester in accordance with aspects of the present disclosure.

FIG. 8 illustrates an example of a receiver 500 for harvesting tree nuts or tree fruit such as almonds in accordance with aspects of the present disclosure. The receiver 500 may be an example of the receiver 20 described with reference to FIG. 1. The receiver 500 may be configured to collect falling fruits or nuts falling from a tree and deposit the nuts or fruit in a desired location such as the ground or a bin. The receiver 500 may include a frame 505, a cab 510, one or more deflectors 515, one or more conveyors 520, a chute 525 (described in more detail with reference to FIG. 11), and a plurality of wheels 530.

The frame 505 may be the main supporting structure of the receiver 500. The frame 505 may be configured to support mechanical components of the receiver 500 and to deal with static and dynamic loads, without undue deflection or distortion. The frame 505 may include one or more beams or rails. Additional features of the frame 505 are shown in FIGS. 9A, 9B, 10A, 10B, and 11.

The cab 510 may be movably coupled with the frame 505. The cab 510 may be rotatable relative to the frame 505. The cab 510 may be configured to slide along the frame in a first direction perpendicular to the direction of travel of the receiver 500. In some cases, the cab 510 may be configured to raise and/or lower its position relative to the ground as well. Each of these abilities to move may be independently configurable thereby providing a plurality of cab positions and/or cab configurations. For example, as described with more detail in FIGS. 9A and 9B, the cab 510 may be movable between a first position parallel to a first direction of travel of the receiver 500 (shown in FIG. 8) and a second position perpendicular to the first direction of travel of the receiver 500. In some cases, the cab 510 may be positionable in more positions than the first position or the second position. The cab 510 may be positionable in a variety of different rotations and/or rotation angles relative to the frame 505.

The one or more deflectors 515 of the receiver 500 may be configured to deflect falling objects (e.g., almonds) onto a conveyor 520 of the receiver 500. The deflectors 515 may be examples of the deflectors 30 described with reference to FIG. 1. The receiver 500 may include any number of deflectors 515 (e.g., one, two, three, four, five, six, seven, eight). In the illustrative example, the receiver 500 may include a single deflector. The deflector 515 may be repositionable. For example, deflector 515 may be configured to move up-and-down or laterally away from or toward the conveyor 520-a. The deflectors 515 may be sized to extend beyond the dimensions of the canopy of the tree, at least the canopy of a first side of the tree. The deflectors 515 may be configured to be positionable based on the canopy of the tree being harvested. The deflectors 515 of the receiver 500 and the deflectors 215 of the shaker 200 may be used to intercept falling fruits or nuts from the same tree. For example, the deflectors 215 of the shaker 200 may be positioned under a first portion of the canopy of the tree being harvested and the deflectors 515 of the receiver 500 may be positioned under a second portion of the canopy of the tree being harvested. The deflectors 215, 515 may direct falling fruits or nuts into the conveyor 520 of the receiver 500. In some cases, the one or more deflectors 515 may be attached via a hinge to the conveyor 520. Both the one or more deflectors 515 and the conveyor 520 may be repositionable. In some cases, the repositioning may be performed concurrently or in unison. In some cases, the repositioning may be independent for each component (e.g., the repositioning of at least one deflector 515 may be independent of the conveyor 520). For example, the 'rear' of the deflector 515 (opposite side of conveyor) may be moved up and down and the 'front' of the deflector 515 may also be independently moved up and down. This allows an angle of the deflector 515 relative to the conveyor 520 to change and a height of the deflector 515 and the conveyor 520 to change.

The one or more conveyors 520 of the receiver 500 may be configured to collect the fruits or nuts deflected by the deflectors 515 of the receiver 500 and the deflectors 215 of the shaker 200. The one or more conveyors 520 may include first conveyor 520-a extending along the length of the receiver 500. The first conveyor 520-a may be positioned on the side of the receiver to be closest to the tree. The first conveyor 520-a may be configured as the collector point for the two-piece harvester. The first conveyor 520-a may be configured to move objects (e.g., fruits or nuts) to a second conveyor 520-b. The second conveyor 520-b may be configured to move the fruits or nuts up and over the receiver 500 to the far side of the receiver 500 to be deposited on the ground or in bins. The second conveyor 520-b may deposit fruits or nuts in the chute 525 or on a third conveyor and the chute 525 (or the third conveyor) may be configured to deposit the fruits or nuts on the ground. The one or more conveyors 520 may include one or more motors, rollers, and/or belts to move the fruits or nuts.

The receiver 500 may include a plurality of wheels 530. In the illustrative example, the receiver 500 includes three wheels, a first wheel 530-a rotating on a first axis of rotation, a second wheel 530-b rotating on a second axis of rotation different than the first axis of rotation, and a third wheel 530-c rotating along a third axis of rotation different than the first axis and the second axis. The wheels 530 may be coupled to the frame 505 using a plurality of components and/or linkages to allow each wheel to be controlled independently. The chute 525 may be positioned over the second wheel 530-b and may be configured to deposit the fruits or nuts on one side of the second wheel 530-b or the other side of the second wheel 530-b based on the direction of travel of the receiver 500.

Each of the wheels 530 may be independently steerable. Meaning that the turning angle of each wheel 530 and/or the direction of travel of each wheel may be independently controlled. By having independent control of each wheel, the receiver 500 may be configured to operate using a plurality of steering modes. A steering mode may indicate a configuration of each wheel 530. A steering mode may indicate a turning angle of a wheel 530, whether a wheel is configured to change its turning angle or whether the turning angle is fixed, whether the turning angle of the wheel is tied to the turning angle of another wheel, a direction of rotation of wheel, whether the direction of rotation of the wheel is tied to the direction of rotation of another wheel, or a combination thereof. Examples of steering modes may include a forward-wheel steer mode, a rear-wheel steer mode, a crab steer mode, and an independent steer mode.

In some cases, the receiver 500 may include a controller to operate in a forward wheel steer mode regardless of the direction of travel. For example, the receiver 500 may be traveling in a first direction down a drive line where the first wheel 530-a is the forward wheel and the third wheel 530-c is the rear wheels. In such a situation, the controller may cause the first Wheel 530-a to steer the receiver 500 and the rear wheel 530-c to have a fixed turning angle. In some cases, the fixed turning angle may position the rear wheel 530-c to be parallel to the frame. If the receiver 500 changes its traveling direction without turning around and begins traveling in a second direction opposite the first direction down the same drive line, the controller may be configured to automatically modify the steering mode. Specifically, the controller may cause the third wheel 530-c (now the forward wheel) to steer the receiver 500 and the first wheel 530-a (now the rear wheel) to have a fixed turning angle. The controller may also determine whether the second wheel 530-b acts as a steer wheel or as a fixed wheel in each of these situations. A controller is described with more detail with reference to FIG. 12.

Figure 9A:
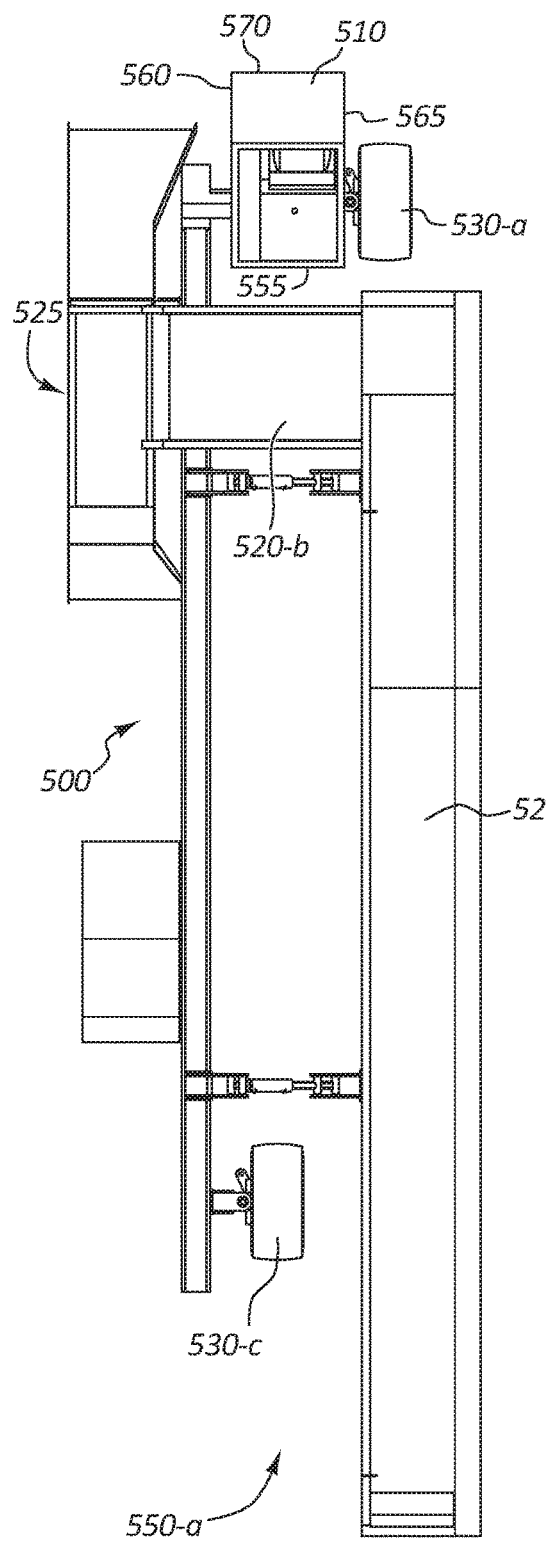
FIGS. 9A and 9B illustrate examples of plan views of a receiver side of a harvester in accordance with aspects of the present disclosure.
Figure 9B:
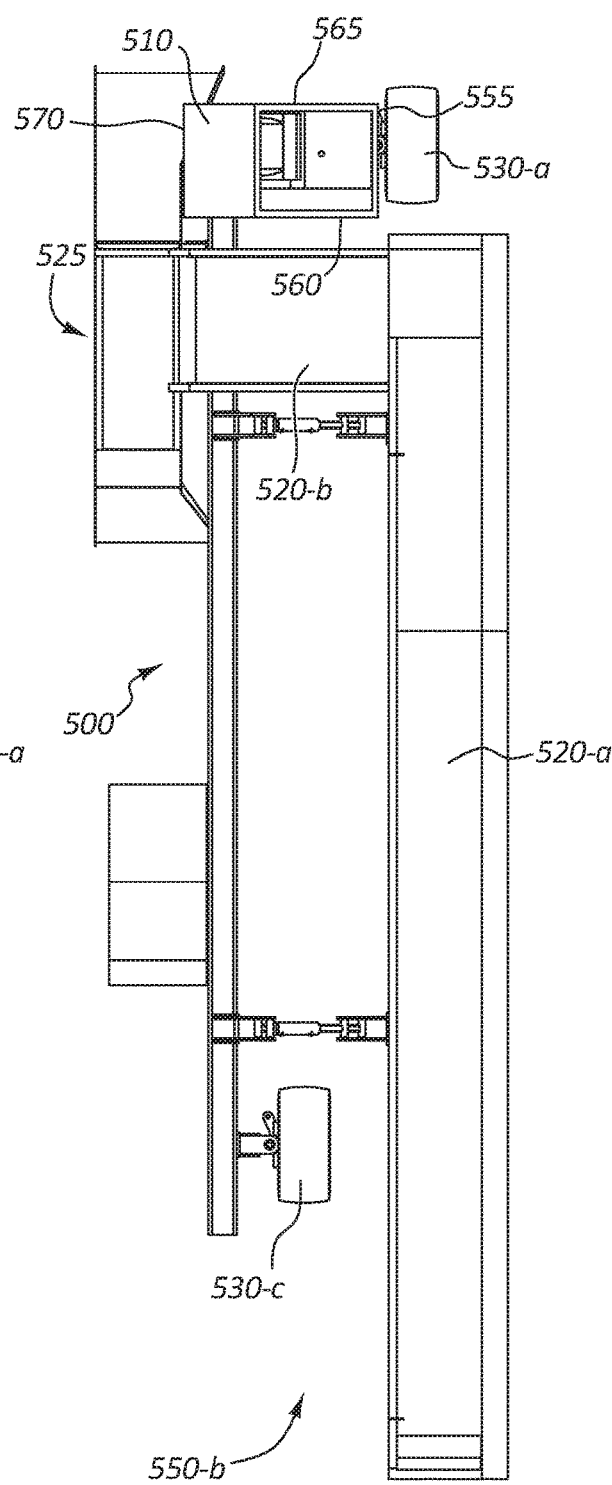

FIGS. 9A and 9B illustrate examples of rotation positions 550 of the cab 510 of the receiver 500 in accordance with aspects of the present disclosure. The receivers 500 are illustrated in using a top plan view with the deflectors removed to highlight the rotation positions 550.

The first rotation position 550-a of FIG. 9A shows the receiver 500 in a first configuration. The first configuration may be used for driving the receiver 500 down a road or for harvesting certain types of fruits or nuts. In some cases, the first configuration may be used for harvesting certain types of fruits or nuts that are deposited in bins instead of being deposited on the ground. The cab 510 may include a front wall 555, a first side wall 560, a second side wall 565 opposite the first side wall 560, and rear wall 570 opposite the front wall 555. When operating the receiver 500, an operator positioned in the cab 510 may be configured to face the front wall 555. In the first rotation position 550-a, the cab 510 may be rotated such that front wall 555 may face the front of the receiver 500 and the first side wall 560 may face the first wheel 530-a.

The first rotation position 550-a may be an example of a first configuration where the operator is capable of controlling the receiver 500 as it travels down a road or as it is loaded or off-loaded from a transportation truck, or for harvesting certain types of fruits or nuts. When in the first rotation position 550-*a*, the operator may have a view of what lies ahead for the direction of travel.

The first rotation position 550-*a* may obstruct a view of the operator while harvesting. In some cases, while harvesting in the first rotation position 550-*a*, an operator's view of certain surroundings may be obstructed. Such obstructed views may lead to mistakes while harvesting and/or damaged trees and/or a damaged crop. From the first rotation position 550-*a*, the cab 510 may be rotatable in a first rotation direction.

The second rotation position 550-*b* of FIG. 9B shows the receiver 500 in a second configuration. The second configuration may be used for harvesting certain types of fruits or nuts (e.g., almonds). In the second rotation position 550-*b*, the cab 510 may be rotated such that front wall 555 may face the first wheel 530-*a* In the second rotation position 550-*b*, the cab 510 may be positioned perpendicular to the direction of travel of the receiver 500, among other configurations.

The second rotation position 550-*b* may provide an operator a view of the first conveyor 520-*a*, both directions of potential travel, and the tree. Thus, while harvesting crops, the operator may be able to observe the tree and the direction of travel and thereby prevent damage to the trees or crops deposited in windrows on the ground.

Figure 10A:
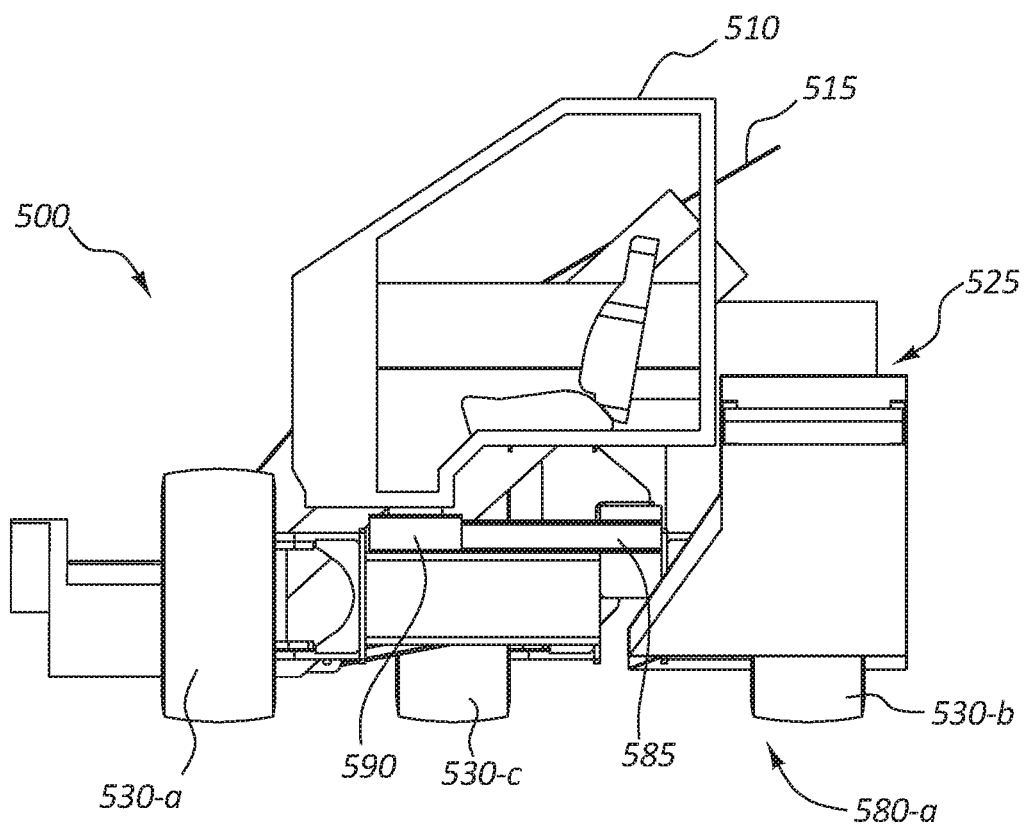
FIGS. 10A and 10B illustrate examples of elevation views of a receiver side of a harvester in accordance with aspects of the present disclosure.
Figure 10B:
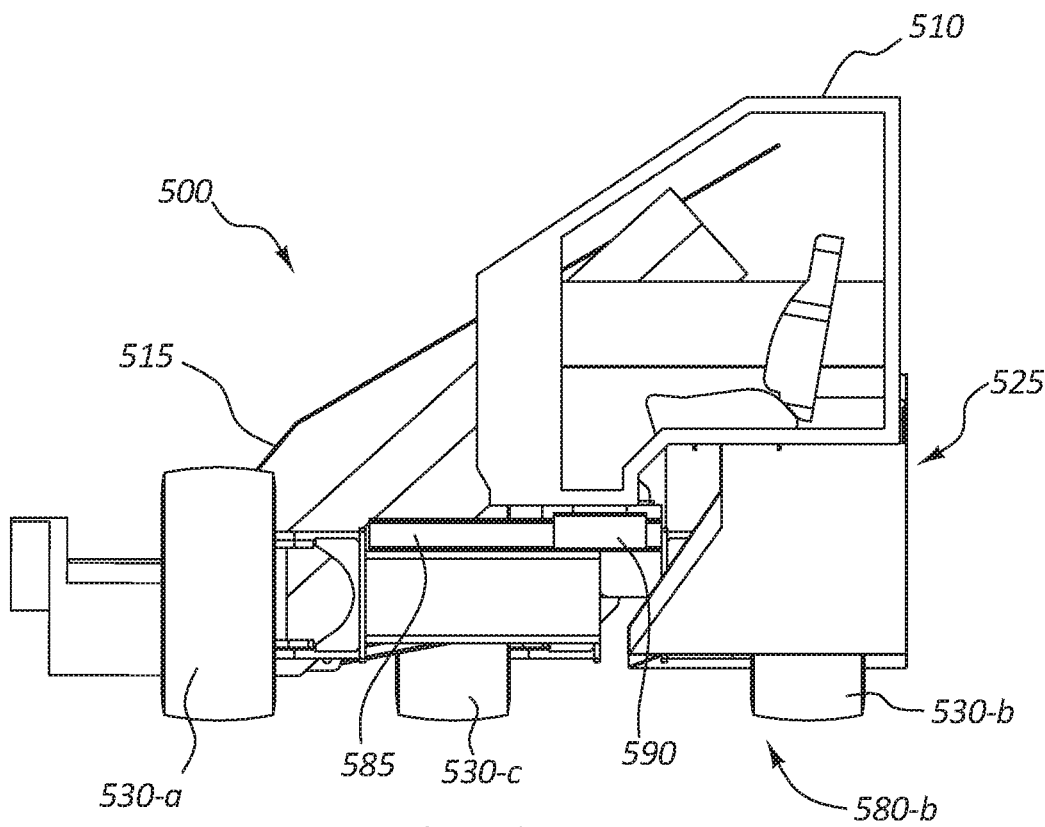

FIGS. 10A and 10B illustrate examples of lateral cab positions 580 of the cab 510 of the receiver 500 in accordance with aspects of the present disclosure. The receivers 500 are illustrated using an elevation view.

The cab 510 may be configured to move side-to-side of the receiver in any configurable rotation position. FIGS. 10A and 10B show the cab in a second rotation position 550-*b* shown and described with reference to FIG. 9B, however, any rotation position is possible. The cab 510 may be movable between a first lateral position 580-*a* near a first wheel 530-*a* and a second lateral position near the chute 525.

The cab 510 may be coupled to a beam 585 of the frame 505 using a coupling component 590. The coupling component 590 may be slidably coupled with the beam 585 and may be rotationally coupled with cab 510. The cab 510 may be movable in the lateral direction because of the positions of the deflectors 515. The deflectors 515 may be configured to move based on the harvesting needs. Certain positions of the deflectors 515 may obstruct a view of an operator positioned in the cab 510. To reduce the obstruction of the view, the cab 510 may be slidable between the first lateral position 580-*a* and the second lateral position 580-*b*. The lateral positions 580 and the rotational positions 550 may be combined in any combination to define a plurality of cab configurations for the cab 510 of the receiver.

Figure 11:
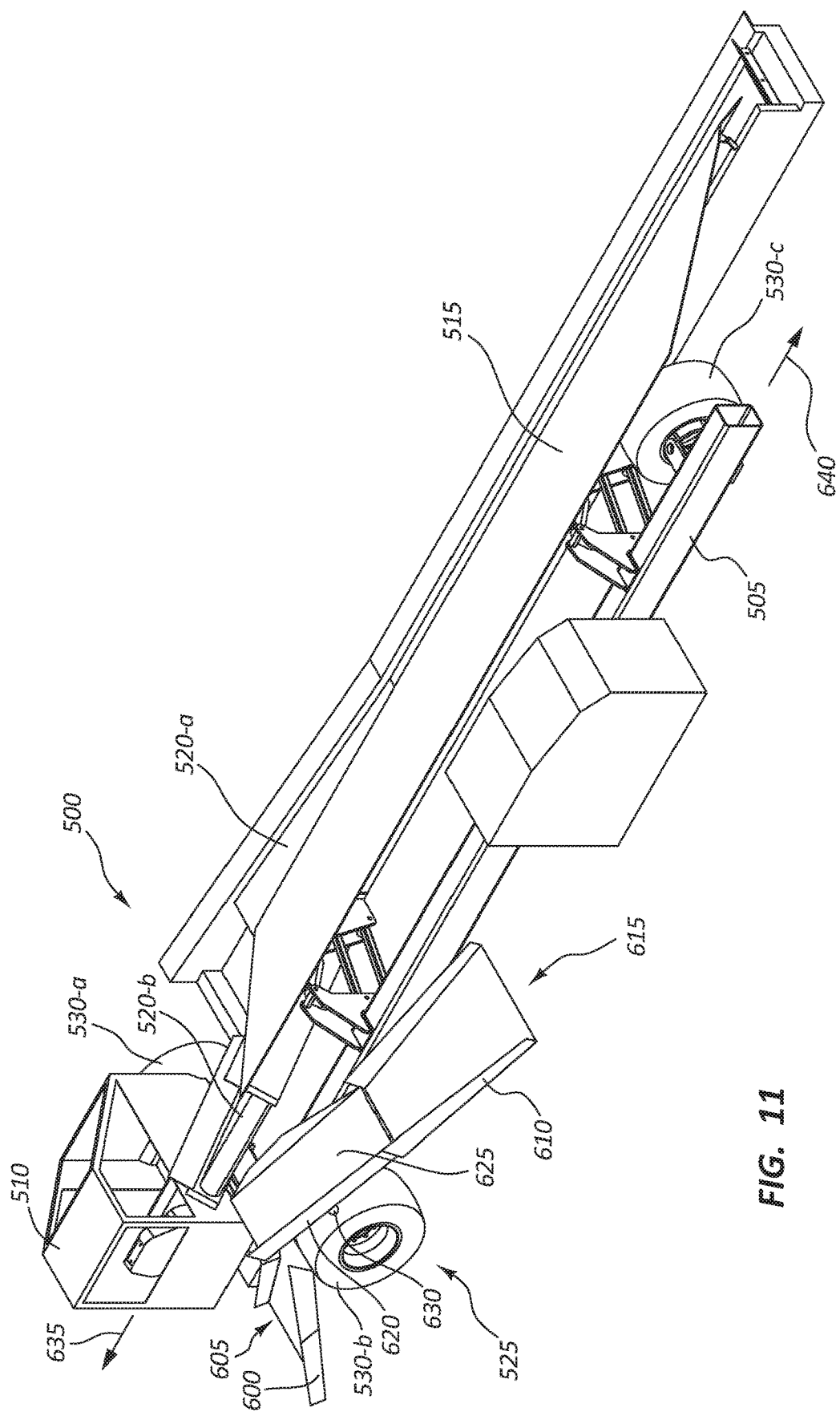
FIG. 11 illustrates an example of perspective view of a receiver side of a harvester in accordance with aspects of the present disclosure.

FIG. 11 illustrates an example of chute 525 of the receiver 500 in accordance with aspects of the present disclosure. The chute 525 may be configured to receive fruits or nuts from the conveyor 520 and deposit the fruits or nuts on the ground in a windrow. The chute 525 may be configured to deposit the fruits or nuts in a plurality of locations. The chute 525 may deposit the fruits or nuts based on the direction of travel of the receiver 500 such that fruits or nuts are deposited behind the moving receiver 500.

The chute 525 may be positioned over the second wheel 530-*b*. The chute 525 may include a first fixed portion 600 configured to direct fruits or nuts to a first side 605 of the second wheel 530-*b*, a second fixed portion 610 configured to direct fruits or nuts to a second side 615 of the second wheel 530-*b*, and a rocking portion 620 configured to selectively direct fruits or nuts to the first fixed portion 600 or the second fixed portion 610.

The rocking portion 620 may be include a channel 625 for directing the fruits or nuts and a rocker bar 630. The channel 625 may be rotationally coupled with the rocker bar 630 and the rocker bar 630 may be fixedly coupled with the frame 505. In some cases, the rocker bar 630 may be fixedly coupled with the channel 625 and may be rotationally coupled with the frame 505. In either case, the rocking portion 620 may be configured to rotate between a first position that directs fruits or nuts to the first fixed portion 600 or a second position that directs fruits or nuts to the second fixed portion 610. In some cases, a bi-directional conveyor may be used to direct fruits or nuts to the fixed portions 600, 610 instead of the rocking portion 620.

The chute 525 may be configured to deposit the fruits or nuts on the side of the second wheel 530-*b* that is opposite the direction of travel of the receiver 500. For example, if the receiver 500 is traveling in a first direction 635, the chute 525 may be configured to deposit the fruits or nuts on the opposite side of the second wheel 530-*b* using the second fixed portion 610. If the receiver 500 is traveling in a second direction 640, the chute 525 may be configured to deposit the fruits or nuts on the opposite side of the second wheel 530-*b* using the first fixed portion 600. Such a configuration prevents damage to the fruits or nuts. If the fruits or nuts are deposited on the same side of the as the direction of travel, the second wheel 530-*b* may immediately crush or damage the fruits or nuts.

Figure 12:
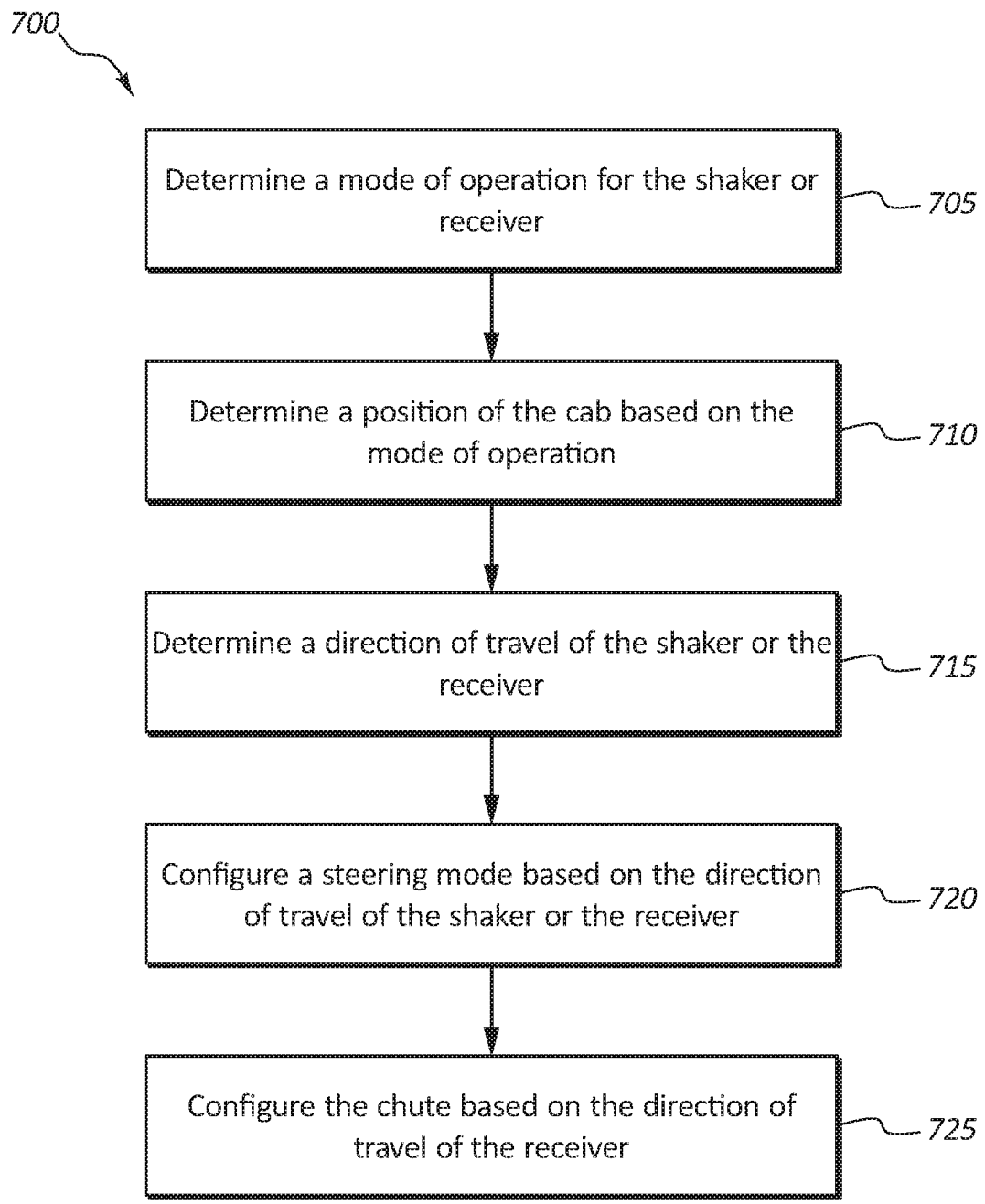
FIG. 12 illustrates an example of process flow for operating the shaker side or the receiver side in accordance with aspects of the present disclosure.

FIG. 12 illustrates an example of process flow 700 for operating the shaker 200 or the receiver 500 in accordance with aspects of the present disclosure. The process flow 700 illustrates functions or procedures for operating the shaker 200 or the receiver 500. The functions or procedures may be performed by a user of the shaker 200 or the receiver 500, a controller of the shaker 200 or the receiver 500, or a combination thereof. The controller may be any combination of hardware, firmware, or software used to perform functions and/or run algorithms. The controller may communicate with one or more sensors and/or one or more actuators or other devices for determining data and for executing commands.

At block 705, the shaker 200 or the receiver 500 may determine a mode of operation for the shaker or receiver. For example, the shaker 200 or the receiver 500 may operate in a harvesting mode or a travel mode. The harvesting mode occur when the shaker 200 or the receiver 500 is actively harvesting fruits or nuts from trees. The travel mode may occur when the shaker 200 or the receiver 500 is traveling along a road or traveling to or from the orchard and their harvesting activities.

At block 710, the shaker 200 or the receiver 500 may determine a position of the cab based on the mode of operation. Cab positions may include a rotational position relative to the frame of the shaker 200 or the receiver 500 or a lateral position relative to the frame of the shaker 200 or the receiver 500 or a height position relative to the frame of the shaker 200 or the receiver 500.

At block 715, the shaker 200 or the receiver 500 may determine a direction of travel of the shaker 200 or the receiver 500. The direction of travel may be used to determine other aspects of operating the shaker 200 or the receiver 500.

At block 720, the shaker 200 or the receiver 500 may configure a steering mode based on the direction of travel of the shaker 200 or the receiver 500. In some cases, the shaker 200 or the receiver 500 may be configured to operate in a forward steer mode. In such cases, if the direction of travel changes, the shaker 200 or the receiver 500 may select the forward wheels to be steer wheels and may select the hack wheels to be fixed wheels. In some cases, such operations may be done automatically by the controller. For example, the controller may make determinations based on measurement(s) made by sensor(s) or a status(es) of input device(s) and may alter the steering mode using one or more actuators. For example, the controller may release linkages for some wheels and may lock linkages for other wheels. The shaker 200 or the receiver 500 may configure other steer modes based on inputs from a user or other factors.

In some cases, the controller may cause the shaker 200 or the receiver 500 to enter a different steering mode other than a forward-wheel steer mode. For example, the controller may cause the shaker 200 or the receiver to enter an all-wheel steer mode (e.g., a crab steer mode). The controller may determine when a turning angle of a steer wheel satisfies a turning angle threshold. When the threshold is satisfied, the controller may enter a different steering mode to assist the shaker 200 or the receiver 500 to complete the requested turn. In some cases, the user may cause the shaker 200 or the receiver 500 to enter such a mode.

At block 725, the receiver 500 may configure the chute based on the direction of travel. The receiver 500 may be capable of depositing fruits or nuts in a plurality of directions. The receiver 500 may select which direction to deposit the fruits or nuts based on the direction of travel of the receiver 500. For example, the receiver 500 may rotate the rocking portion of the chute to change which direction the fruits or nuts are deposited.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a. DSP core, and/or any other such configuration. An operating system utilized by the processor (or by I/O controller module or another module described above) may be iOS®, ANDROID®, MS-DOS®, MS-WINDOWS®, OS/2®, UNIX®, LINUX®, or another known operating system.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A system, comprising:
    a shaker comprising:
        a first frame comprising a central beam;
        a first plurality of wheels coupled with the first frame and positioned to cause the shaker to travel in a first direction and a second direction opposite the first direction;
        a shaker head comprising moveable pincers coupled with a motor and configured to shake a tree;
        a plurality of deflectors positioned to direct fruits or nuts falling from the tree toward the shaker head in response to shaking the tree, wherein a first deflector of the plurality of deflectors is moveable in a vertical direction toward or away from a ground, and wherein a second deflector of the plurality of deflectors is moveable in a horizontal direction toward or away from the shaker head, wherein a first movement of the first deflector is independent of a second movement of the second deflector;
        a first coupling component coupled with the central beam of the first frame; and
        a shaker cab coupled with the first coupling component and configured to house an operator of the shaker, the first coupling component configured to rotate the shaker cab between a first position parallel to a first direction of travel of the shaker and a second position perpendicular to the first direction of travel of the shaker; and
    a receiver comprising:
        a second frame;
        a second plurality of wheels coupled with the second frame and positioned to cause the receiver to travel in the first direction and the second direction opposite the first direction;
        a third deflector positioned at a second angle toward the a first conveyor to direct the fruits or nuts falling from the tree toward the first conveyor;
        the first conveyor configured to receive the fruits or nuts from the third deflector of the receiver and the plurality of deflectors of the shaker, move the fruits or nuts in the first direction, and deposit the fruits or nuts onto a second conveyor;
        a chute coupled with the second frame and configured to receive the fruits or nuts from the second conveyor and deposit the fruits or nuts onto the ground;
        a second coupling component coupled with the second frame; and
        a receiver cab coupled with the second coupling component and configured to house an operator of the receiver, the second coupling component configured to rotate the receiver cab between a third position parallel to a direction of travel of the receiver and a fourth position perpendicular to the direction of travel of the receiver.

2. The system of claim 1, wherein the shaker cab of the shaker further comprises:
    a front wall defining a nose of the shaker cab;
    a first side wall defining a side of the shaker cab; and
    a bearing feature on a front inboard corner configured to permit the shaker cab to rotate relative to the first deflector of the shaker.

3. The system of claim 1, wherein the shaker further comprises:
    a wheel that is positionable in a retracted position and an extended position, wherein the wheel is configured to be used in the extended position when the shaker is traveling along a drive row that includes a line of fruits or nuts deposited on the ground.

4. The system of claim 1, wherein
    the chute is configured to receive the fruits or nuts from the second conveyor and configured to deposit the fruits or nuts on the ground on a first side of a wheel of the receiver when the receiver travels in the first direction and on a second side of the wheel when the receive travels in the second direction.

5. The system of claim 1, wherein the fourth position of the receiver cab is configured to be offset in a lateral direction from the third position.

6. The system of claim 1, wherein the shaker and the receiver are configured to collect the fruits or nuts that fall from the tree shaken by the shaker.

7. The system of claim 1, wherein the second coupling component and the receiver cab are slidable along a beam of the second frame.

8. A device, comprising:
    a shaker comprising:
        a frame comprising a central beam;
        a plurality of wheels coupled with the frame and positioned to cause the shaker to travel in a first direction and a second direction opposite the first direction;
        a shaker head comprising moveable pincers coupled with a motor and configured to shake a tree;
        a plurality of deflectors positioned to direct fruits or nuts falling from the tree toward the shaker head in response to shaking the tree, wherein a first deflector of the plurality of deflectors is moveable in a vertical direction toward or away from a ground, and wherein a second deflector of the plurality of deflectors is moveable in a horizontal direction toward or away from the shaker head, wherein a first movement of the first deflector is independent of a second movement of the second deflector;
        a coupling component coupled with the central beam of the frame; and
        a cab coupled with the coupling component and configured to house an operator of the shaker, the coupling component configured to rotate the cab between a first position parallel to a first direction of travel of the shaker and a second position perpendicular to the first direction of travel of the shaker.

9. The device of claim 8, wherein
    each wheel of the plurality of wheels is configured to be turned independently of other wheels of the plurality of wheels, wherein the shaker is configured to automatically cause the plurality of wheels to operate in a forward-wheel steering mode when traveling in the first direction.

10. The device of claim 8, wherein
    the frame extends between an axis of rotation of a rear wheel and an axis of rotation of a front wheel; and
    the coupling component is configured to suspend the cab above a ground, the coupling component coupled with the frame in a fixed position relative to the frame and rotatably coupled with the cab.

11. The device of claim 10, wherein the coupling component is coupled with a front inboard corner of the cab.

12. The device of claim 8, wherein the cab of the shaker further comprises:
a front wall defining a nose of the cab;
a first side wall defining a side of the cab; and
a bearing feature on a front inboard corner configured to permit the cab to rotate relative to the plurality of deflectors of the shaker.

13. The device of claim 12, wherein the cab of the shaker further comprises:
a second side wall positioned opposite the first side wall and defining a side of the cab, the second side wall being coupled with the front wall.

14. The device of claim 8, wherein the shaker further comprises:
a wheel that is positionable in a retracted position and an extended position, wherein the wheel rotates about a same axis of rotation in the retracted position and the extended position.

15. The device of claim 14, wherein the extended position of the wheel is configured to be used when the shaker is traveling along a drive row that includes a line of fruits or nuts deposited on a ground.

16. The device of claim 8, wherein the cab is configured for transporting the shaker along a road in the first position and the cab is configured for shaking trees in the second position.

17. The device of claim 8, wherein the cab is rotatable to a third position different from the first position and the second position.

18. The device of claim 17, wherein the third position is rotated 180 degrees relative to the first position.

19. A device, comprising:
a receiver comprising:
a frame;
a plurality of wheels coupled with the frame and positioned to cause the receiver to travel in a first direction and a second direction opposite the first direction;
a deflector positioned at an angle toward a first conveyor to direct fruits or nuts falling from the tree toward the first conveyor;
the first conveyor configured to receive the fruits or nuts from the deflector of the receiver, move the fruits or nuts in the first direction, and deposit the fruits or nuts onto a second conveyor;
a chute coupled with the frame and configured to receive the fruits or nuts from the second conveyor and deposit the fruits or nuts onto a ground;
a coupling component slidably coupled with the frame; and
a cab coupled with the coupling component and configured to house an operator of the receiver, the coupling component configured to rotate the cab between a first position parallel to a direction of travel of the receiver and a second position perpendicular to the direction of travel of the receiver.

20. The device of claim 19, wherein the coupling component is configured to slide the cab between a first lateral position near the first conveyor of the receiver and a second lateral position away from the first conveyor.

21. The device of claim 19, wherein
the chute is configured to deposit the fruits or nuts on the ground in a plurality of different directions.

22. The device of claim 21, wherein the chute is positioned over a wheel of the receiver and is configured to selectively deposit the fruits or nuts on the ground on a first side of the wheel or on a second side of the wheel based at least in part on the direction of travel of the receiver.

23. The device of claim 19, wherein the first position of the cab is configured for transporting the receiver along a road and the second position of the cab is configured for receiving the fruits or nuts.

24. The device of claim 19, wherein
each wheel of the plurality of wheels rotates on an axis of rotation that is different from axes of rotation of other wheels of the plurality of wheels, wherein the receiver is configured to automatically adjust from a first forward-wheel steering mode when the receiver travels in the first direction to a second forward-wheel steering mode when the receive travels in the second direction.

25. The device of claim 24, wherein the receiver is configured to automatically adjust to a three-wheel steer mode based at least in part on determining that a turning angle of at least one wheel exceeds a turning angle threshold.

26. The device of claim 24, wherein the receiver is configured to adjust to a crab-wheel steering mode.

27. The device of claim 19, wherein the second position of the cab is configured to be offset in a lateral direction from the first position.

28. The device of claim 19, wherein the cab is rotatable to a third position different from the first position and the second position, and wherein the third position is rotated 180 degrees relative to the first position.

* * * * *